(12) United States Patent
Urano et al.

(10) Patent No.: US 6,657,434 B2
(45) Date of Patent: Dec. 2, 2003

(54) SURFACE POTENTIAL DETECTION APPARATUS

(75) Inventors: Takashi Urano, Chuo-ku (JP); Takashi Yamamoto, Chuo-ku (JP)

(73) Assignee: TDK Corporation, Tokyo (JP)

( * ) Notice: Subject to any disclaimer, the term of this patent is extended or adjusted under 35 U.S.C. 154(b) by 26 days.

(21) Appl. No.: 09/963,428

(22) Filed: Sep. 27, 2001

(65) Prior Publication Data

US 2002/0063564 A1 May 30, 2002

(30) Foreign Application Priority Data

Nov. 24, 2000 (JP) ........................................ 2000-358432

(51) Int. Cl.⁷ ............................................. G01R 29/12
(52) U.S. Cl. ....................................................... 324/458
(58) Field of Search ................................. 324/458, 457, 324/72, 123, 613, 614, 109; 355/216–218, 77; 340/649–661; 399/46, 48, 31; 430/48

(56) References Cited

U.S. PATENT DOCUMENTS

| 4,370,616 A | | 1/1983 | Williams |
| 4,724,393 A | * | 2/1988 | Kumada et al. ............ 324/458 |
| 4,797,620 A | | 1/1989 | Williams |

FOREIGN PATENT DOCUMENTS

JP          3-6467          1/1991

* cited by examiner

*Primary Examiner*—N. Le
*Assistant Examiner*—Amy He
(74) *Attorney, Agent, or Firm*—Oblon, Spivak, McClelland, Maier & Neustadt, P.C.

(57) ABSTRACT

A surface potential detection apparatus in which surface potential sensors are provided independently of one another. A switching circuit individually selects and outputs signals provided from the surface potential sensors with varied timing for individual surface potential sensors. A single signal processing circuit connected to the surface potential sensors via the switching circuit is shared by the surface potential sensors.

27 Claims, 16 Drawing Sheets

SURFACE POTENTIAL DETECTION APPARATUS

BACKGROUND OF THE INVENTION

1. Field of the Invention

The present invention relates to a surface potential detection apparatus and a surface potential detection method in which a surface potential is measured through a non-contact method.

2. Discussion of Background

A surface potential detection apparatus of this type, which may be employed to detect the surface potential of a photosensitive drum in a photocopier, laser beam printer or the like through a non-contact method, for instance, utilizes a surface potential sensor that generates an AC signal corresponding to the surface potential of the photosensitive drum by using a tuning fork to mechanically interrupt the electrical field between a detection electrode and the photosensitive drum as disclosed in Japanese Examined Patent Publication No. 6467/1991 and the like. The AC signal is then amplified at a pre-amplifier and the amplified signal is guided to a synchronous detection circuit via an isolator, where the signal wave is detected with a signal that is synchronized with the mechanical interruption. The synchronous detection output signal output from the synchronous detection circuit is converted to a DC signal at an integrating circuit. The DC signal obtained at the integrating circuit is input to a high-voltage amplifier.

The individual circuits share a common ground line. The high-voltage amplifier controls the potential at the common ground line in conformance to the input DC signal so as to equalize the potential at the common ground line to the potential at the surface of the photosensitive drum which is the measurement target surface. By extracting the potential at the common ground line via an attenuator, a buffer amplifier and the like, a surface potential signal is obtained. The common ground line achieves a floating relationship with a ground potential or the frame ground potential.

The greatest advantage achieved through this method is that even when the distance between the surface potential sensor that includes the tuning fork and the detection electrode and the surface of the photosensitive drum constituting the measurement target surface changes, a highly accurate surface potential detection signal manifesting a very low degree of distance dependency is obtained.

The surface potential detection apparatus described above normally includes two units, i.e., a surface potential sensor and a signal processing device. The surface potential sensor is constituted as a type of probe which includes a detection electrode, a tuning fork, a drive circuit, a pre-amplifier and the like. The signal processing device includes the remaining circuit portion that is needed to achieve the function as a surface potential detection apparatus.

Numerous tandem type high-speed photocopiers and laser printers have been proposed and put into practical use in recent years. In these image generating apparatuses utilizing four photosensitive drums (cyan, magenta, yellow and black), the surface potentials at the four photosensitive drums must be measured.

Since it is necessary to provide one surface potential sensor and one signal processing device in conjunction with each photosensitive drum in the prior art, four sets each having a surface potential sensor and a signal processing device must be provided for the four photosensitive drums. Each signal processing device constituting a surface potential detection apparatus has a complicated circuit structure and includes two transformers, which is bound to cause increases in the size, the weight and the production cost of the device. Accordingly, in the prior art, the size, the weight and the production cost of the surface potential detection apparatus itself are notably significant since the signal processing device must be provided for each of the four photosensitive drums, posing a critical problem to be addressed.

In addition, since the surface potential sensor in the prior art, which obtains an AC signal corresponding to the surface potential at the photosensitive drum by mechanically interrupting the electrical field between the detection electrode and the photosensitive drum with a tuning fork, has a complicated structure that includes a mechanically movable part, a great deal of time and work must be expended to manufacture, assemble, adjust, maintain and inspect the surface potential sensor.

SUMMARY OF THE INVENTION

It is a first object of the present invention to provide a surface potential detection apparatus that achieves simplification in the circuit, miniaturization and reductions in the weight and the production cost.

It is a second object of the present invention to provide a new and improved surface potential detection method which makes it possible to detect a surface potential with a high degree of reliability through a simple structure and a surface potential detection apparatus and a surface potential detection sensor that may be directly utilized to implement the method.

It is a third object of the present invention to provide a new and improved surface potential detection method which greatly facilitates the processes of production, assembly, adjustment, inspection, maintenance and the like and a surface potential detection apparatus and a surface potential detection sensor that may be directly utilized to implement the method.

In order to achieve the first object, the surface potential detection apparatus according to the present invention includes a plurality of surface potential sensors, a switching circuit and a signal processing circuit. The plurality of surface potential sensors are provided independently of one another. The switching circuit individually selects and outputs signals provided by the surface potential sensors with varied timing for each surface potential sensor. The signal processing circuit is connected to the plurality of surface potential sensors via the switching circuit to serve the plurality of surface potential sensors.

Since the surface potential detection apparatus according to the present invention is provided with the plurality of surface potential sensors which function independently of one another, the surface potential sensors may be utilized in conjunction with four photosensitive drums (cyan, magenta, yellow and black) in an image generating apparatus such as a tandem type high-speed photocopier or a tandem type high-speed laser beam printer to individually detect the surface potentials at the four photosensitive drums.

The switching circuit individually selects and outputs the signals provided by the plurality of surface potential sensors with varied timing for each surface potential sensor. Thus, the signals that are output from the plurality of surface potential sensors can be extracted separately from one another over time.

Since the signal processing circuit is connected to the plurality of surface potential sensors via the switching circuit, it receives the signals from the surface potential sensors separately over time. Then, it implements necessary signal processing within time frames allocated to the individual surface potential sensors.

The signal processing circuit is shared by the plurality of surface potential sensors. Thus, only a single signal processing circuit is required. This greatly simplifies the circuit structure and also greatly reduces the size, the weight and the production cost compared to the surface potential detection apparatus in the prior art which necessitates four sets each constituted of a surface potential sensor and a signal processing device to be provided in conjunction with the four photosensitive drums.

Each of the plurality of surface potential sensors may assume a structure adopted in the known art. Typically, the surface potential sensors each generate an AC signal corresponding to the surface potential at the measurement target surface by interrupting the electrical field between the detection electrode and the measurement target surface. In this case, the switching circuit individually selects and outputs the detection signal and a synchronous signal which is in synchronization with a drive signal for interruption provided by each surface potential sensor with varying timings for the individual surface potential sensors.

In a typical structure assumed by the surface potential detection apparatus according to the present invention, the plurality of surface potential sensors and the signal processing circuit share a common ground line. The signal processing circuit implements control on the potential at the common ground line so as to roughly equalize the potential at the common ground line to the potential at a measurement target surface. As a result, a highly accurate surface potential detection signal with a very low degree of distance dependency is obtained even when the distance between a surface potential sensor and the surface of the corresponding photosensitive drum constituting the measurement target surface changes.

In order to achieve the second and third objects, a stationary electrode is provided between a surface potential measurement target and a detection electrode, the areas surrounding the detection electrode and the stationary electrode are electromagnetically shielded and the stationary electrode is set facing opposite the surface potential measurement target through an unshielded detection window to enable surface potential detection according to the present invention. The impedance between the shield potential and the stationary electrode is cyclically changed.

By providing the stationary electrode between the surface potential measurement target and the detection electrode, setting the stationary electrode facing opposite the surface potential measurement target through the detection window and changing the impedance between the shield potential and the stationary electrode as described above, the electrical field between the detection electrode and the surface potential measurement target is also allowed to change cyclically in correspondence to the cyclical change in the impedance. As a result, a signal (an AC signal) corresponding to the cyclical change in the electrical field between the detection electrode and the surface potential measurement target is generated at the detection electrode. Consequently, by guiding the signal generated at the detection electrode to a signal processing circuit of the known art, the surface potential can be detected.

The areas around the detection electrode and the stationary electrode are electromagnetically shielded and the stationary electrode is set facing opposite the surface potential measurement target via an unshielded detection window, to enable detection of the surface potential almost completely unaffected by external noise.

It is desirable to vary the value of the impedance between the shield potential and the stationary electrode so as to achieve the shape of a sine wave along the time axis. This makes it possible to obtain a signal essentially achieving a sine-wave shape at the detection electrode.

In the surface potential detection method according to the present invention, the complicated structure necessitated in the prior art in which the electrical field between a detection electrode and the corresponding photosensitive drum is interrupted mechanically by using a tuning fork can be replaced with a single stationary electrode. It is obvious that this method may be effectively adopted to achieve simplification in the structure of the sensor and to facilitate the processes of production, assembly, adjustment, maintenance and inspection.

The surface potential detection apparatus used to implement the surface potential detection method described above includes a surface potential sensor and a signal processing circuit.

The surface potential sensor comprises a shield case, a detection electrode, a stationary electrode and an impedance-varying circuit. The shield case which includes a detection window covers the detection electrode, the stationary electrode and the impedance-varying circuit.

The stationary electrode is provided between the detection window and the detection electrode, and the impedance-varying circuit cyclically changes the impedance between the shield case and the stationary electrode. The signal processing circuit processes the signal output by the surface potential sensor.

It is obvious that the surface potential detection apparatus described above may be directly utilized to implement the surface potential detection method according to the present invention.

The surface potential sensor according to the present invention comprises a shield case, a detection electrode and a stationary electrode. The shield case includes a detection window and the detection electrode is provided inside the shield case. The stationary electrode which is provided inside the shield case is set between the detection window and the detection electrode.

It is obvious that this surface potential sensor may be utilized to constitute the surface potential detection apparatus described earlier.

Other objects, structural features and advantages of the present invention are explained in further detail by referring to the attached drawings. The attached drawings are provided simply to illustrate specific examples.

DETAILED DESCRIPTION OF THE PREFERRED EMBODIMENTS

Figure 1:
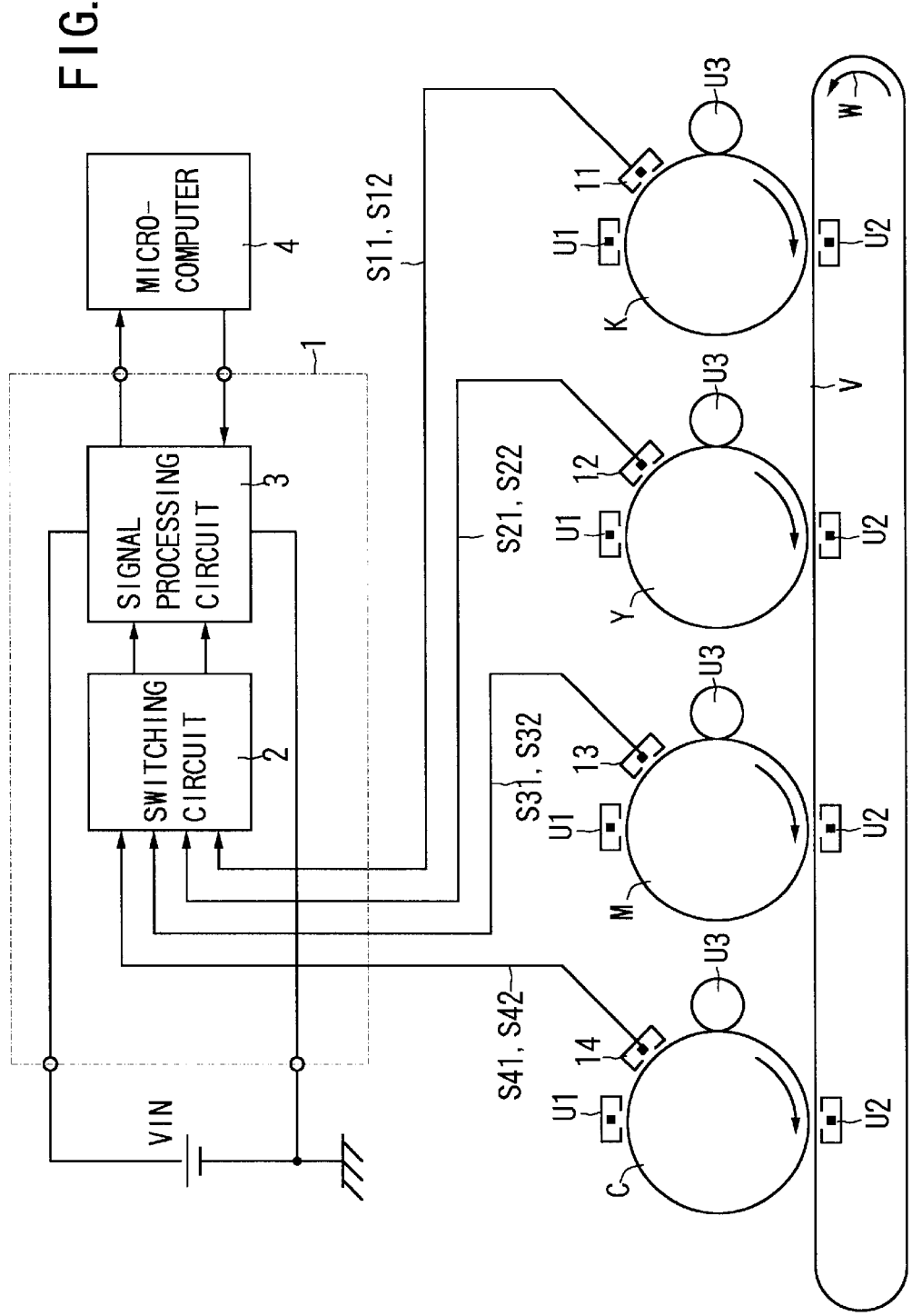
FIG. 1 schematically illustrates a structure that may be adopted to detect the surface potentials of four photosensitive drums set in tandem by employing the surface potential detection apparatus according to the present invention.

FIG. 1 schematically illustrates a structure that may be adopted to detect the surface potentials at four photosensitive drums set in tandem by employing the surface potential detection apparatus according to the present invention. In the figure, four photosensitive drums K, Y, M and C are provided in tandem along the direction in which transfer belt V runs. Photosensitive drum K, photosensitive drum Y, photosensitive drum M and photosensitive drum C are respectively provided for black, yellow, magenta, and cyan. Photosensitive drums K to C are each provided with charge colortron U1, transfer colortron U2 and developer U3.

The surface potential detection apparatus according to the present invention includes a plurality (four) of surface potential sensors 11 to 14, a switching circuit 2 and a signal processing circuit 3.

The four surface potential sensors 11 to 14 function independently of one another. Surface potential sensors 11 to 14 are provided in conjunction with photosensitive drums K to C respectively, and each is secured over a distance of, for instance, 2.5 mm from the surface of corresponding photosensitive drum K to C. Signals S11 to S41 and S12 to S42 respectively obtained at surface potential sensors 11 to 14 are provided to switching circuit 2 via coaxial cables or the like.

Switching circuit 2 individually selects and outputs the signals provided by surface potential sensors 11 to 14 with varied timing for individual surface potential sensors 11 to 14.

Signal processing circuit 3, which is connected to the four surface potential sensors 11 to 14 via switching circuit 2, is shared by the four surface potential sensors 11 to 14.

Microcomputer 4 is provided in the embodiment to implement control on signal processing circuit 3. In addition, although not shown, a reference signal is generated at a reference signal generating device over specific time intervals to take in surface potential information indicating the surface potentials at the individual photosensitive drums K to C with varying timings.

Since the four surface potential sensors 11 to 14 are provided independently of one another in the surface potential detection apparatus in the embodiment, surface potential sensors 11 to 14 can each be utilized in correspondence to one of the four photosensitive drums K to C in an image generating apparatus such as a tandem type photocopier or a tandem type laser beam printer achieving higher speed to enable individual detections of the surface potentials at the four photosensitive drums K to C.

Switching circuit 2 individually selects and outputs signals S11 to S41 and S12 to S42 provided by the four surface potential sensors 11 to 14 with varied timing for individual surface potential sensors 11 to 14. Consequently, the signals output from the four surface potential sensors 11 to 14 can be separated over time.

Figure 2:
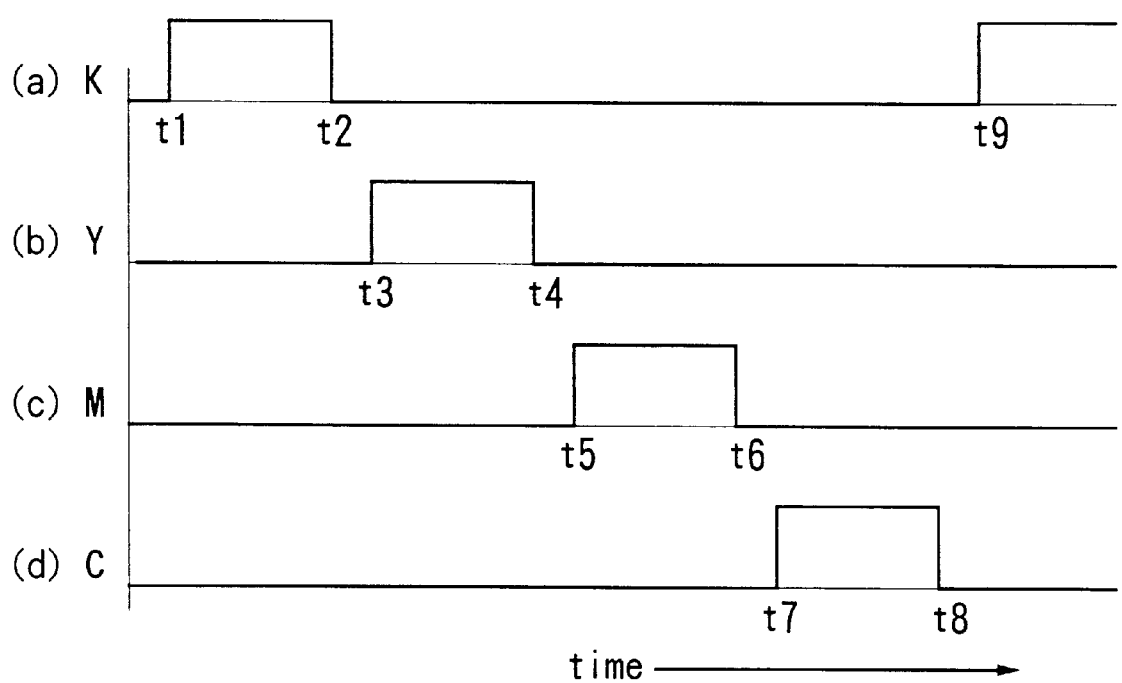
FIG. 2 presents a time chart of a specific example of the signal selection operation performed by the switching circuit included in the surface potential detection apparatus according to the present invention.

FIG. 2 presents a time chart of a specific example of the signal selection operation performed at the switching circuit 2. First, as shown in FIG. 2(a), the signals output from surface potential sensor 11 provided for photosensitive drum K alone are selected between time point t1 and time point t2. Next, as shown in FIG. 2(b), the signals output from surface potential sensor 12 provided for photosensitive drum Y alone are selected between time point t3 and time point t4.

As shown in FIG. 2(c), the signals output from surface potential sensor 13 provided for photosensitive drum M alone are selected between time point t5 and time point t6 and as shown in FIG. 2(d), the signals output from surface potential sensor 14 provided for photosensitive drum C alone are selected between time point t7 and time point t8.

As a means for selecting signals S11 to S41 and S12 to S42 with varying timings for the individual surface potential sensors 11 to 14, control signals may be provided from microcomputer 4 to switching circuit 2.

Signal processing circuit 3 is connected to the four surface potential sensors 11 to 14 via switching circuit 2. Thus, signal processing circuit 3 receives the signals from individual surface potential sensors 11 to 14 separately over time. Then, it implements the necessary signal processing on them within time frames allocated for individual surface potential sensors 11 to 14.

Signal processing circuit 3 is shared by the four surface potential sensors 11 to 14. This means that only one signal processing circuit 3 needs to be provided. As a result, the circuit structure is greatly simplified and the size, the weight and the production cost of the surface potential detection apparatus are greatly reduced compared to those in the prior art in which it is necessary to provide surface potential sensors 11 to 14 and four signal processing devices each provided to serve one of four surface potential sensors 11 to 14 in conjunction with the four photosensitive drums K to C.

Each of the four surface potential sensors 11 to 14 may assume a structure adopted in the known art. Typically, surface potential sensors 11 to 14 each generate an AC signal in conformance to the surface potential at corresponding photosensitive drums K to C by interrupting the electrical field between a detection electrode and the measurement target surface. In this case, switching circuit 2 selects and outputs the detection signal and/or a synchronous signal which is in synchronization with a drive signal for interruption provided by surface potential sensors 11 to 14 with varying timings for individual surface potential sensors 11 to 14.

Figure 3:
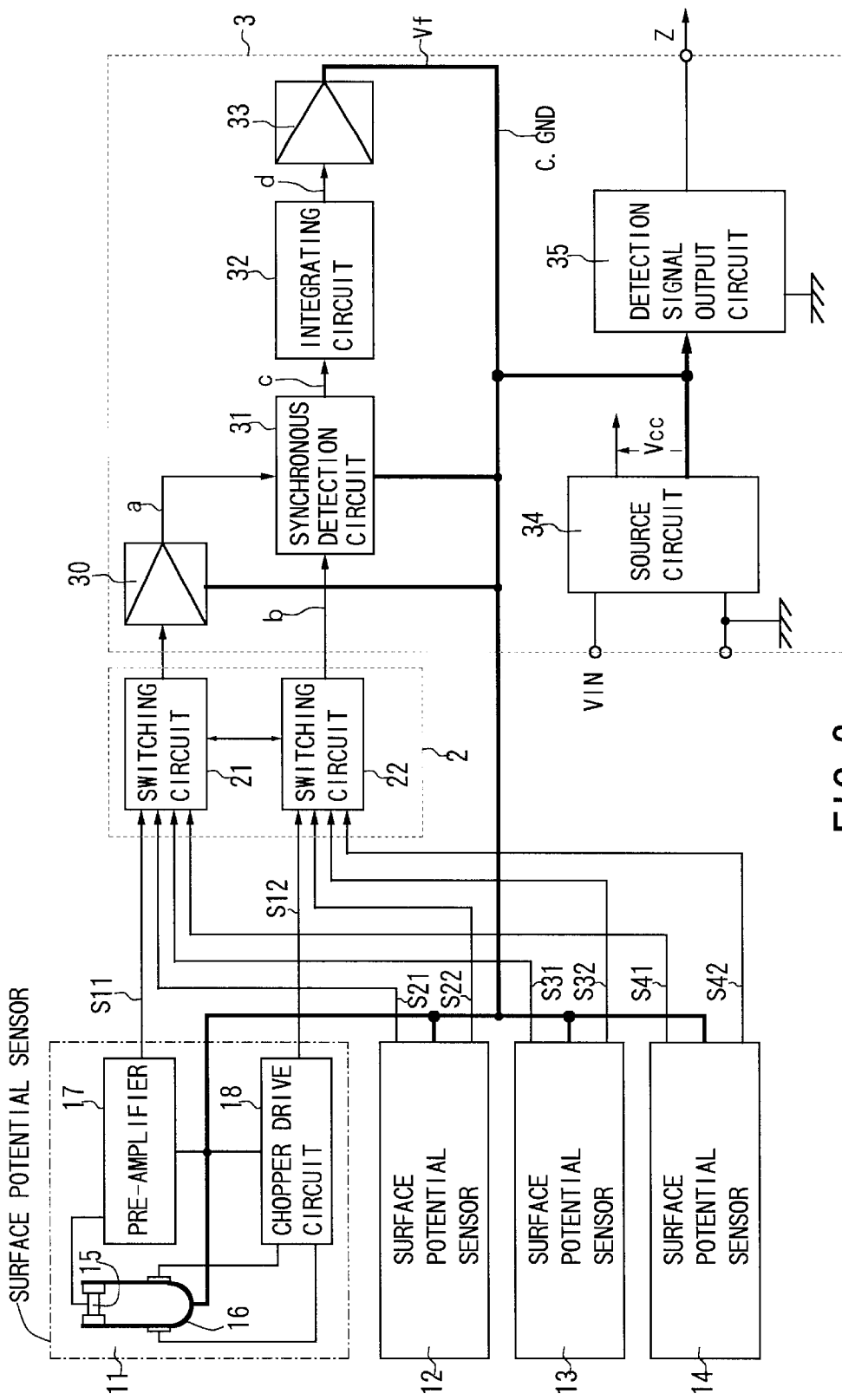
FIG. 3 is a block diagram showing the structure adopted in the surface potential detection apparatus according to the present invention in further detail.

FIG. 3 presents a block diagram illustrating the structure adopted in the surface potential detection apparatus according to the present invention in further detail. Since the four surface potential sensors 11 to 14 in the figure adopt structures identical to one another, an explanation is given by referring to surface potential sensor 11 as a typical example. Surface potential sensor 11 includes detection electrode 15, chopper 16, pre-amplifier 17 and chopper drive circuit 18. Detection electrode 15 generates an electrical field which is used to measure the surface potential at photosensitive drum K through a non-contact method.

Chopper 16 cyclically chops the electrical field between the measurement target surface, i.e. the surface of photosensitive drum K and detection electrode 15. Specific structural features that may be adopted are of the known art. For instance, a tuning fork may be excited by a piezoelectric resonator to vibrate a metal piece attached to the tuning fork between the surface of photosensitive drum K and detection electrode 15.

Pre-amplifier 17 converts the impedance of the AC signal detected at detection electrode 15 to a low impedance. The AC signal (detection signal) S11 having passed through pre-amplifier 17 is provided to switching circuit 21. Chopper drive circuit 18 excites chopper 16. In more specific terms it excites chopper 16 by providing a drive signal achieving a predetermined frequency to the piezoelectric resonator constituting chopper 16. From surface potential sensors 12 to 14, too, AC signals S21 to S41 having passed through pre-amplifiers 17 are provided to switching circuit 21.

Figure 4:
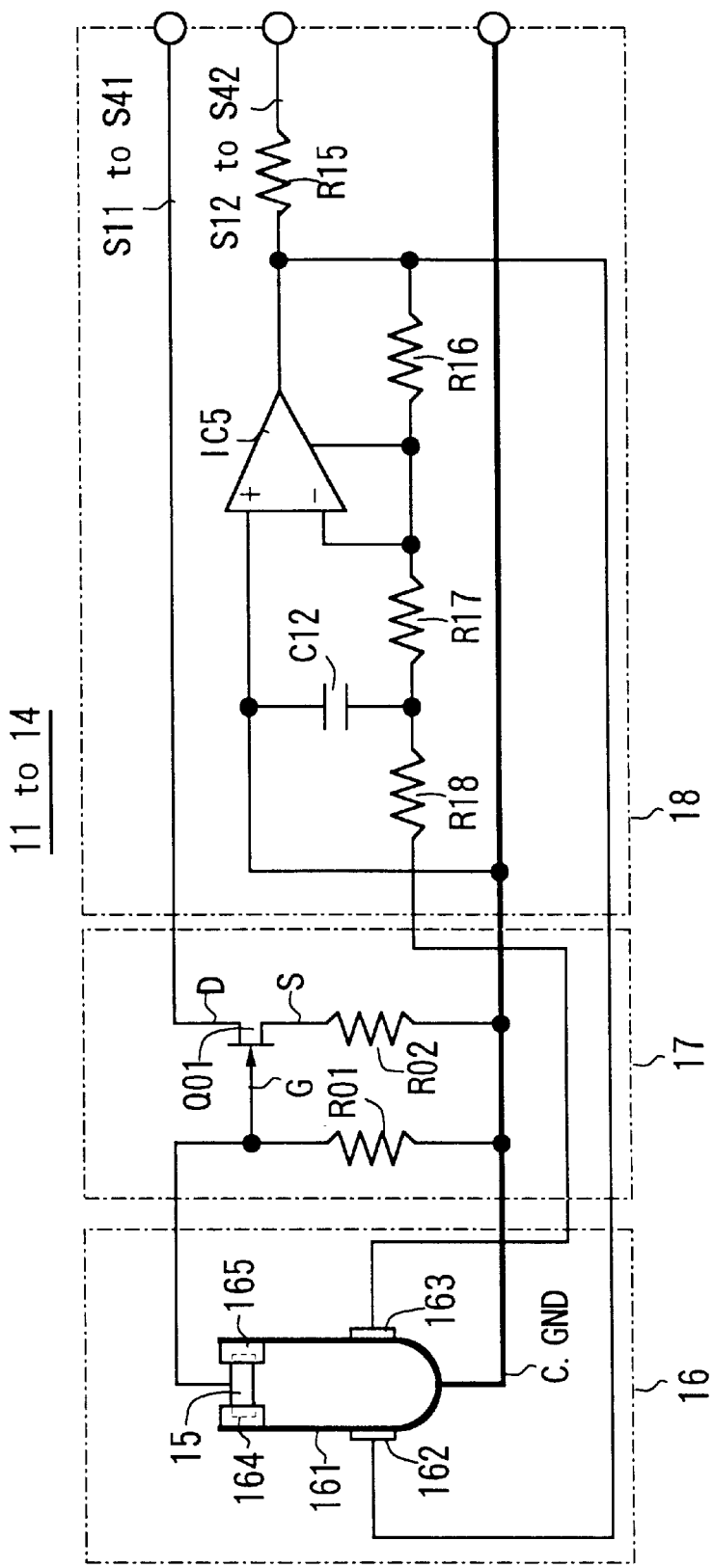
FIG. 4 shows a specific example of a circuit structure that may be adopted in the surface potential sensors included in the surface potential detection apparatus according to the present invention.

FIG. 4 shows a specific circuit structure that may be adopted in surface potential sensors 11 to 14. For purposes of simplification, an explanation is given by referring to surface potential sensor 11 provided in conjunction with photosensitive drum K. In the figure, chopper 16 is achieved by mounting piezoelectric resonator 162 at tuning fork 161 to excite tuning fork 161 with piezoelectric resonator 162 at a specific frequency. The vibration of tuning fork 161 is detected by piezoelectric resonator 163 and the detected vibration is input as a feedback signal to chopper drive circuit 18.

At the free ends of tuning fork 161, metal pieces 164 and 165 are attached. Metal pieces 164 and 165 are provided between the surface of photosensitive drum K (see FIG. 1) and detection electrode 15. Thus, when metal pieces 164 and 165 are excited by the vibration of tuning fork 161, the electrical field between the measurement target surface, i.e., the surface of photosensitive drum K and detection electrode 15 is cyclically chopped.

Pre-amplifier 17, which includes amplifier element Q01 constituted of an interlocked selection operation field effect transistor (hereinafter referred to as FET), gate resistor R01 and source resistor R02, converts the impedance of the AC signal detected at detection electrode 15 to a low impedance. To explain this point in further detail, the source of the FET constituting amplifier element Q01 at pre-amplifier circuit 17 is grounded via resistor R02. The AC signal manifesting at detection electrode 15 is provided to the gate of amplifier element Q01, and as amplifier element Q01 engages in operation, a negative bias is applied at amplifier element Q01 by the amplified signal through source resistor R02, resulting in the high impedance signal at the input of amplifier element Q01 converted to a low impedance signal which then manifests at drain D of amplifier element Q01.

Chopper drive circuit 18 includes operational amplifier IC5, resistors R18, R17 and R16 and capacitor C12. When a drive signal is provided by operational amplifier IC5 to piezoelectric resonator 162, piezoelectric resonator 162 excites tuning fork 161. The vibration of tuning fork 161 generates a feedback signal at piezoelectric resonator 163 which results in a positive feedback applied to operational amplifier IC5 by resistor R18, capacitor C12 and resistors R17 and R16 and thus, the next drive pulse is applied to piezoelectric resonator 162. By repeating this operation, tuning fork 161 continues to vibrate at an inherent frequency (e.g., 680 Hz) at its own mechanical resonance point.

The vibration of tuning fork 161 causes metal pieces 164 and 165 attached to the free ends of tuning fork 161 to vibrate, thereby chopping the electrical field between detection electrode 15 and the measurement target surface at photosensitive drum K. Thus, the capacitance between detection electrode 15 and the measurement target surface at photosensitive drum K fluctuates around a capacitance manifesting when tuning fork 161 is not excited while achieving a waveform with a roughly sine-wave shape, and accordingly, AC detection signal S11 is obtained.

The drive signal generated by chopper drive circuit 18 or signal S12 which is in synchronization with the drive signal is provided to switching circuit 22. While switching circuit 21 and 22 are shown as different blocks from each other in FIG. 3, they may be constituted as integrated switching circuit 2, instead. Switching circuit 2 engages in an interlocked selection operation so as to simultaneously select detection signal S11 and synchronous signal S12 from surface potential sensor 11 provided in conjunction with photosensitive drum K.

Surface potential sensors 12 to 14 provided in conjunction with other photosensitive drums Y, M and C, too, engage in the operation explained in reference to surface potential sensor 11. First, switching circuit 2 performs an interlocked selection operation so as to simultaneously select detection signal S21 and synchronous signal S22 and from surface potential sensor 12 provided in conjunction with photosensitive drum Y. Then, switching circuit 2 performs an interlocked selection operation so as to simultaneously select detection signal S31 and synchronous signal S32 from surface potential sensor 13 provided in conjunction with photosensitive drum M. It also performs an interlocked selection operation so as to simultaneously select detection signal S41 and synchronous signal S42 from surface potential sensor 14 provided in conjunction with photosensitive drum C.

Figure 5:
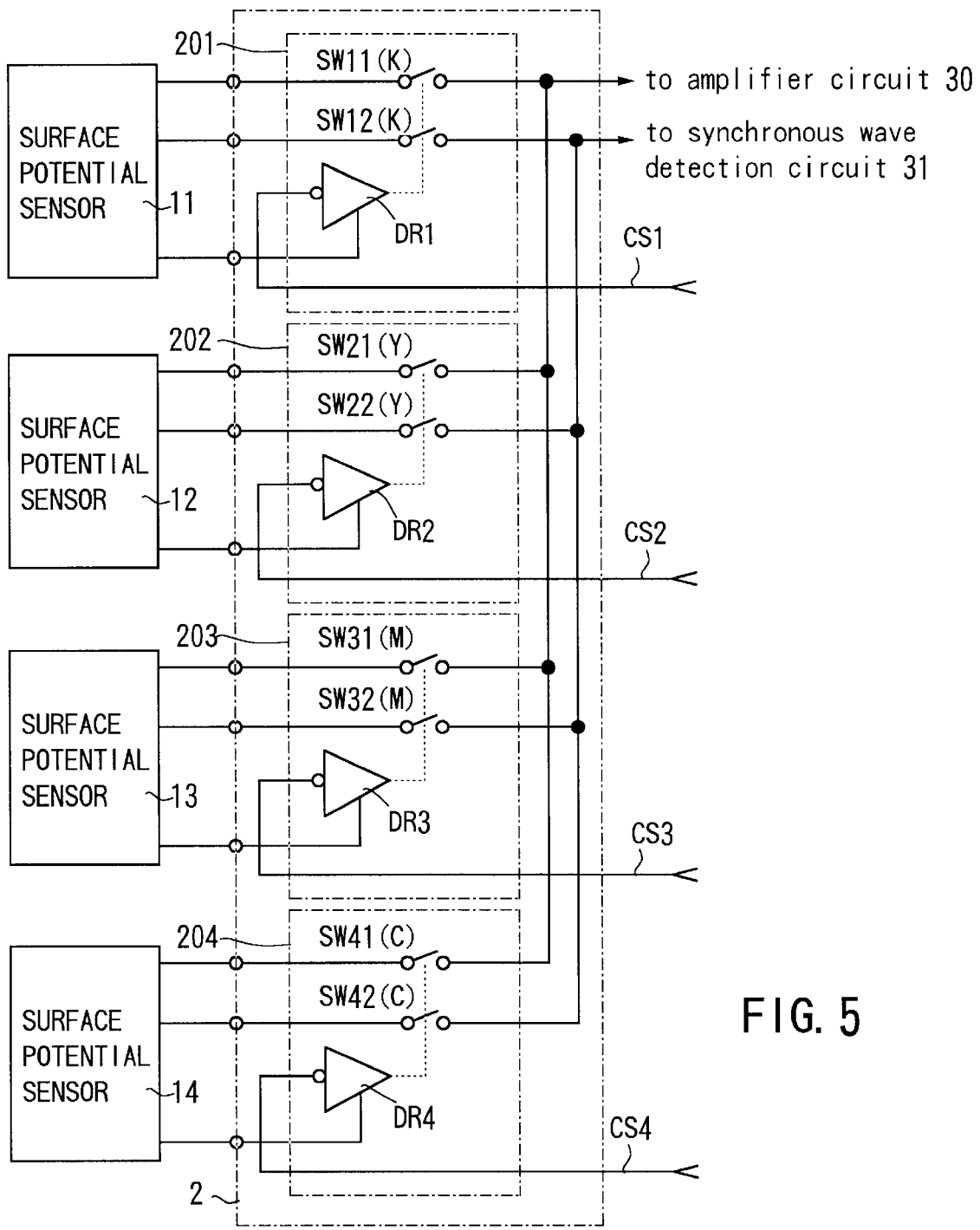
FIG. 5 shows an electrical circuit diagram presenting a specific example of the switching circuit included in the surface potential detection apparatus according to the present invention.

FIG. 5 presents an electric circuit diagram showing a specific example of the switching circuit that may be adopted. Switching circuit 2 in the figure includes first switching circuit 201 to fourth switching circuit 204. First switching circuit 201 is provided with switches SW11 (K) and SW12 (K) used to select detection signal S11 and synchronous signal S12 supplied by surface potential sensor 11 which is provided in conjunction with photosensitive drum K. Switches SW11 (K) and SW12 (K) are simultaneously driven by drive circuit DR1 constituted of a CMOS. In other words, the switches engage in an interlocked operation. In FIG. 5, CS1 through CS4 represent control signals.

Second switching circuit 202 is provided with switches SW21 (Y) and SW22 (Y) used to select detection signal S21 and synchronous signal S22 supplied by surface potential sensor 12 which is provided in conjunction with photosensitive drum Y. Switches SW21 (Y) and SW22 (Y) are simultaneously driven by drive circuit DR2 constituted of a CMOS.

Third switching circuit 203 is provided with switches SW31 (M) and SW 32 (M) used to select detection signal S31 and synchronous signal S32 supplied by surface potential sensor 13 which is provided in conjunction with photosensitive drum M. Switches SW31 (M) and SW32 (M) are simultaneously driven by drive circuit DR3 constituted of a CMOS.

Fourth switching circuit 204 is provided with switches SW41 (C) and SW42 (C) used to select detection signal S41 and synchronous signal S42 supplied by surface potential sensor 14 which is provided in conjunction with photosensitive drum C. Switches SW41 (C) and SW42 (C) are simultaneously driven by drive circuit DR4 constituted of a CMOS.

An explanation is given in reference to FIGS. 1 and 3 again. Signal processing circuit 3 comprises amplifier circuit 30, synchronous detection circuit 31, integrating circuit 32 and high-voltage amplifier circuit 33. Amplifier circuit 30 amplifies detection signals S11 to S14 provided from surface potential sensors 11 to 14 and outputs the amplified signals. Synchronous detection circuit 31 detects signal "a" provided by amplifier circuit 30 in synchronization with a signal "b" provided by switching circuit 2. Integrating circuit 32 converts a detection signal provided by synchronous detection circuit 31 to a direct current and outputs the DC signal resulting from the conversion.

High-voltage amplifier circuit 33 raises the voltage of signal "d" provided by integrating circuit 32. The signal, the voltage of which has been raised at the high voltage amplifier circuit 33 is fed back to tuning fork 16, pre-amplifier 17 and drive circuit 18 as feedback voltage Vf. As a result, feedback control that roughly equalizes the potential at common ground line C.GND to the potential at the measurement target surface at photosensitive drums K to C is implemented.

The signal, the voltage of which has been raised at high-voltage amplifier circuit 33 travels through detection signal output circuit 35 and is output as surface potential detection signal Z.

Signal processing circuit 3 includes source circuit 34 which generates a DC voltage Vcc. The DC voltage Vcc is supplied to the various components as an operating voltage. Source circuit 34 includes an isolation transformer and the DC voltage Vcc is output through the secondary side of the isolation transformer. The DC voltage Vcc is a voltage set in reference to the potential at common ground line C.GND.

Figure 6:
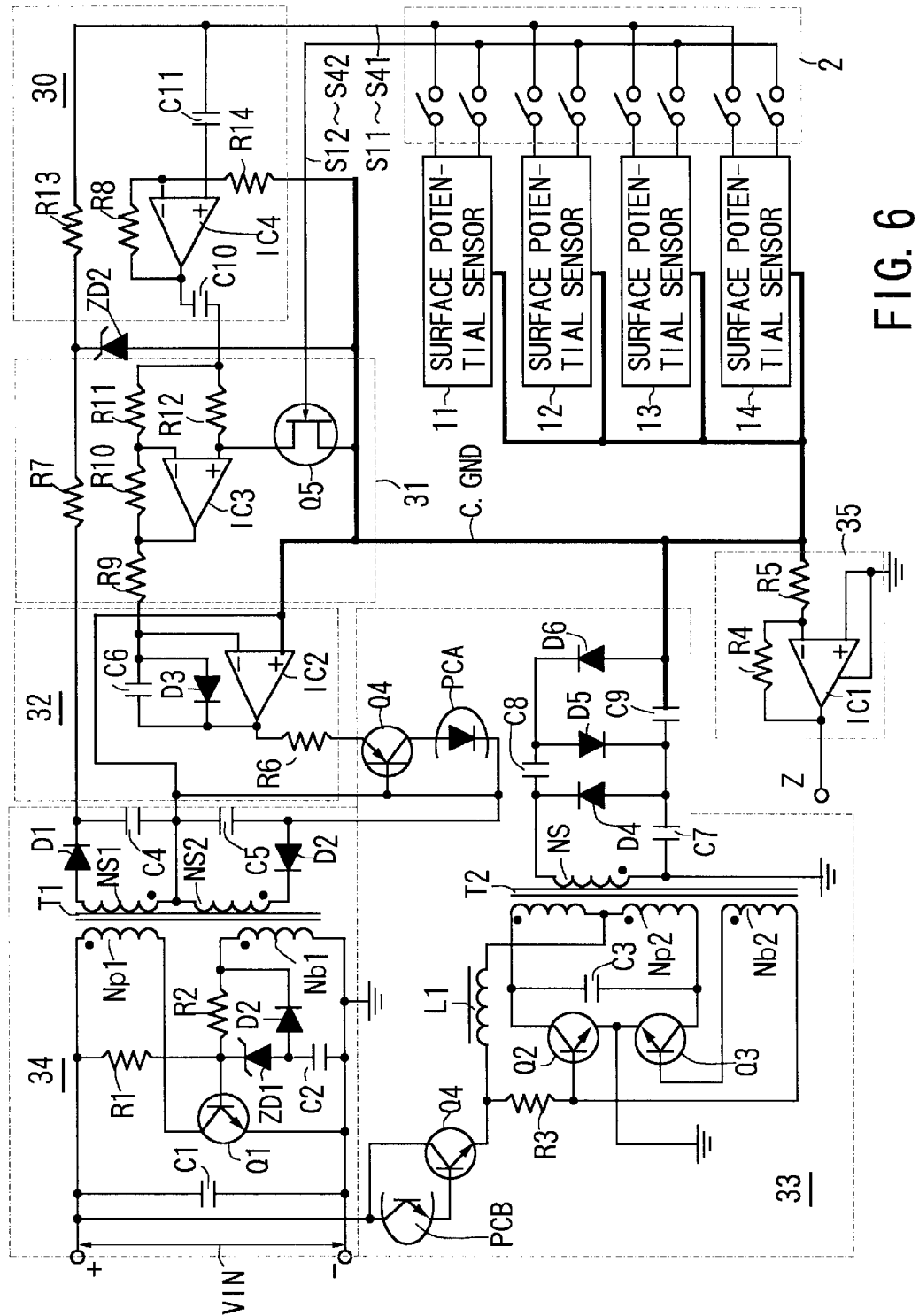
FIG. 6 presents in further detail the circuit structure adopted in the signal processing circuit included in the surface potential detection apparatus according to the present invention.

FIG. 6 shows the circuit structure adopted in the signal processing circuit 3 included in the surface potential detection apparatus according to the present invention in further detail. Amplifier circuit 30, which comprises operational amplifier IC4, resistors R8, R13 and R14 and capacitors C10 and C11 amplifies detection signals S11 to S41 provided via the switches included in switching circuit 2 and capacitor C11.

The signals amplified at amplifier circuit 30 are provided to synchronous detection circuit 31 via capacitor C10. Synchronous detection circuit 31 is provided with operational amplifier IC3, resistors R9, R10, R11 and R12 and FET Q5 constituting a switching element. Synchronous detection circuit 31 performs a synchronous detection of the signals provided from amplifier circuit 30 in conformance to synchronous signals S12 to S42 provided to the gate of FET Q5.

The signals having undergone the synchronous detection are provided to integrating circuit 32 where they are converted to direct currents. Integrating circuit 32 in the figure includes operational amplifier IC2, capacitor C6, diode D3 and output resistor R6. Output resistor R6 is connected with transistor Q4 and light emitting diode PCA. The light emitting diode PCA emits light in response to an output from integrating circuit 32.

High-voltage amplifier circuit 33 comprises an oscillation circuit, a transformer T2 and a triple voltage rectifier circuit. The oscillation circuit includes transistors Q2 and Q3, primary winding Np2 of transformer T2, auxiliary winding Nb2 provided at transformer T2, capacitor C3 and inductor L1. Through a switching operation performed at transistors Q2 and Q3, primary winding Np2 of transformer T2 is excited and a feedback signal is provided to the bases of transistors Q2 and Q3 via auxiliary winding Nb2 inductively coupled with primary winding Np2. The feedback signal and the resonance phenomenon manifesting at an LC resonant circuit which includes capacitor C3 and inductor L1 allow transistors Q2 and Q3 to sustain self oscillation.

The triple voltage rectifier circuit, which is connected to secondary winding NS of transformer T2, implements triple voltage rectification on the AC voltage generated at the secondary winding NS in response to the oscillation operation of the oscillation circuit and supplies the rectified voltage to the common ground line C.GND. The rectified voltage thus supplied controls the potential at the common ground line C.GND. The triple voltage rectifier circuit in the figure comprises capacitors C7 to C9 and diodes D4 to D6.

The input side of high-voltage amplifier circuit 33 is connected with an input circuit constituted of photo-transistor PCB and transistor Q4. Photo-transistor PCB is optically coupled with light emitting diode PCA which is driven by the output from integrating circuit 32. Thus, the voltage controlled in correspondence to the level of the output signal from integrating circuit 32 is supplied to the input side of the oscillation circuit constituting high-voltage amplifier circuit 33.

The potential at common ground line C.GND is converted to an appropriate potential by detection signal output circuit 35 and is output as surface potential detection signal Z.

Source circuit 34 engages switching element Q1 to switch a DC input voltage VIN supplied through a primary winding NP1 of a transformer T1. During the switching operation, the voltages generated at secondary windings NS1 and NS2 of transformer T1 are converted to DC voltages by rectifying them at diodes D1 and D2 and then smoothing them at capacitors C4 and C5. The DC voltages are stabilized at Zener diode ZD2 and then supplied to amplifier circuit 30, synchronous detection circuit 31, integrating circuit 32, light emitting diode PCA and the like.

FIG. 6 simply presents an example of the structure that may be adopted in the signal processing circuit. The signal processing circuit according to the present invention may adopt any of various other circuit structures.

Figure 7:
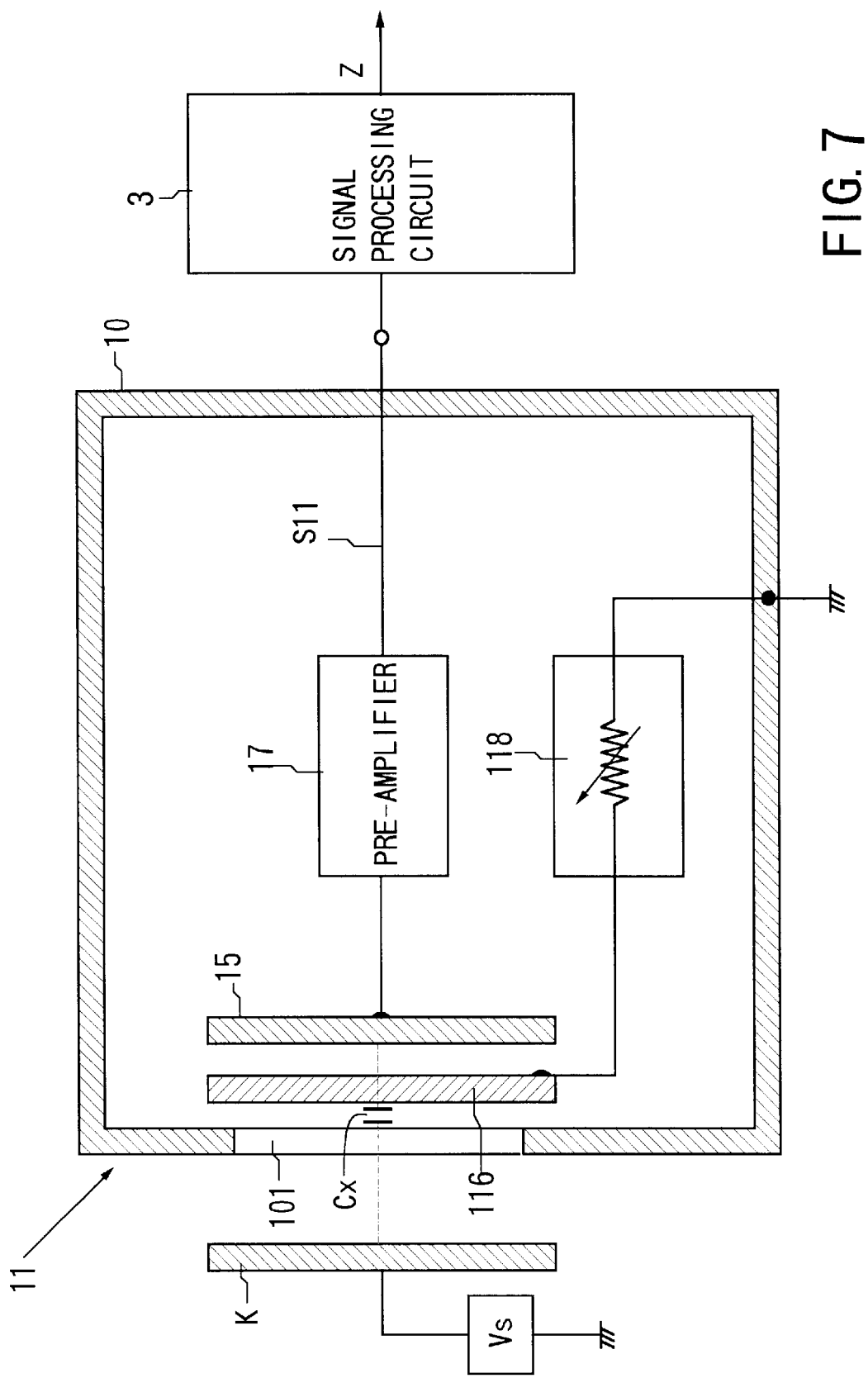
FIG. 7 schematically shows the structure of a surface potential detection apparatus that may be employed to implement the surface potential detection method according to the present invention.

FIG. 7 schematically illustrates the structure of a surface potential apparatus that may be utilized to implement the surface potential detection method according to the present invention. The surface potential detection apparatus in the figure includes surface potential sensor 11 and signal processing circuit 3.

Surface potential sensor 11 includes shield case 10, detection electrode 15, stationary electrode 116 and an impedance-varying circuit 118.

Shield case 10 includes detection window 101 and covers detection electrode 15, stationary electrode 116 and impedance-varying circuit 118. Shield case 10 is specifically provided to shield detection electrode 15 engaged in the potential detection operation from the adverse effects of external electromagnetic waves and thus it may be constituted by using a conductive material known as an effective electromagnetic wave shielding material in the prior art. The shape and the like assumed for shield case 10 are arbitrary. The basic requirement for detection window 101 is that it allows an electrical field to be transmitted through it. While detection window 101 is constituted of a space formed by cutting out a portion of shield case 10, detection window 101 may assume a structure having an organic or inorganic insulating member provided at the cut-out space.

Stationary electrode 116 is provided between detection window 101 and detection electrode 15. Stationary electrode 116 may be constituted of a conductive material such as metal. Stationary electrode 116 may be constituted by adopting any of various modes including a thin metal plate, a metal mesh and a metal lattice. In addition, it does not need to be formed as a flat plate and it may assume any of various shapes such as a shape with a curved portion or a rod shape.

Impedance-varying circuit 118 cyclically changes the impedance between shield case 10 and stationary electrode 116. One end of impedance-varying circuit 118 is electrically connected with stationary electrode 116 with the other end thereof electrically connected to shield case 10. Shield case 10 is connected to the ground, the potential of which is used as a reference for surface potential Vs. As an alternative, a structure achieved by connecting shield case 10 to a potential other than the ground potential and connecting impedance-varying circuit 118 to shield case 10 may be adopted.

It is most desirable that impedance-varying circuit 118 has characteristics whereby the impedance value manifests a change that achieves the shape of a sine wave along the time axis. While impedance-varying circuit 118 is shown as a variable resistance circuit in the figure, the indication in the figure is merely symbolic.

Signal processing circuit 3 processes signal S11 output from surface potential sensor 11. Surface potential sensor 11 in the figure includes pre-amplifier 17 which amplifies a signal output from detection electrode 15 and outputs the amplified signal. Accordingly, signal S11 having been amplified at pre-amplifier 17 is provided to signal processing circuit 3.

Detection window 101 is set facing surface potential measurement target K when measuring the surface potential of surface potential measurement target K charged to achieve surface potential Vs by employing the surface potential detection apparatus described above. While surface potential measurement target K is typically a photosensitive drum provided in a photocopier, a laser beam printer or the like, it does not need to be a photosensitive drum. For instance, the present invention may be adopted to detect the electrostatic charge quantity at film during the process of manufacturing various types of insulating film.

When impedance-varying circuit 118 cyclically changes the impedance between shield case 10 and stationary electrode 116 with detection window 101 turned toward surface potential measurement target K, capacitance Cx between detection electrode 15 and surface potential measurement target K also cyclically changes in conformance to the cyclical change occurring in the impedance. As a result, the electrical field between detection electrode 15 and surface potential measurement target K, too, changes cyclically. The principle of this operation is essentially the same as mechanically interrupting the electrical field between the detection electrode and surface potential measurement target K with a tuning fork.

Consequently, a signal (AC signal) corresponding to the cyclical change in the electrical field between detection electrode 15 and surface potential measurement target K is generated at detection electrode 15. The signal generated at detection electrode 15 is guided to signal processing circuit 3. Signal processing circuit 3 outputs detection signal Z corresponding to surface potential Vs. The detection of the surface potential is thus achieved.

As described above, in surface potential sensor 11 and the surface potential detection apparatus having this surface potential sensor 11 according to the present invention, the complicated structure in the prior art in which the electrical field between detection electrode 15 and surface potential measurement target K is mechanically interrupted with a tuning fork is replaced with single stationary electrode 116 which does not include any moving parts and, as a result, the structure of surface potential sensor 11 is simplified and the processes of production, assembly, adjustment, inspection, maintenance and the like are greatly facilitated.

Furthermore, shield case 10 covers detection electrode 15, stationary electrode 116 and impedance-varying circuit 118 and stationary electrode 116 is provided between detection window 101 at shield case 10 and detection electrode 15, which enables the detection of surface potential Vs practically unaffected by any external noise.

Figure 8:
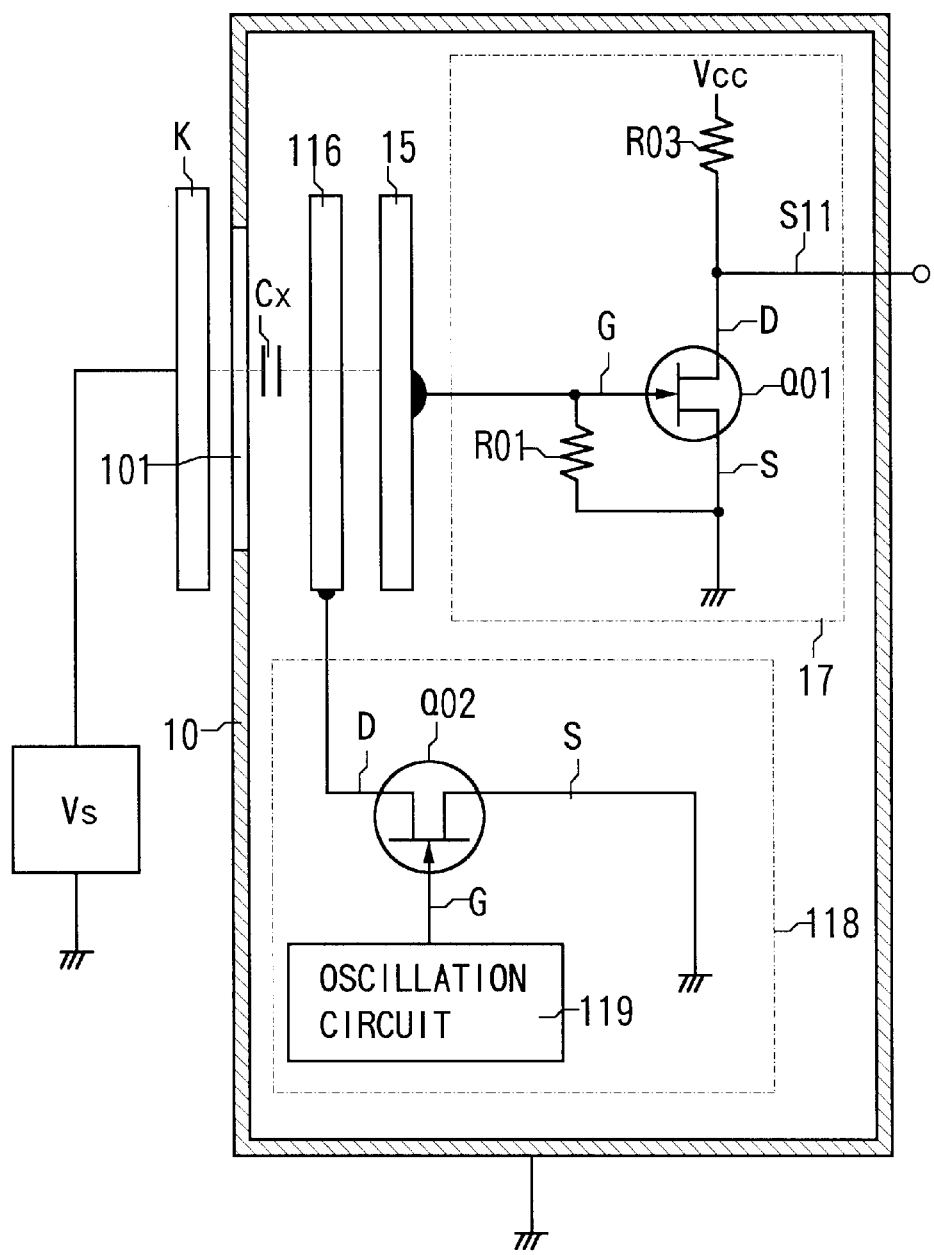
FIG. 8 shows the structure adopted in the surface potential detection apparatus in FIG. 7 in further detail.

FIG. 8 shows the structure of the surface potential detection apparatus in FIG. 7 in further detail. In the figure, the same reference numerals are assigned to components identical to those in FIG. 7. In this embodiment, impedance-varying circuit 118 includes impedance-varying element Q02 and oscillation circuit 119. Impedance-varying element Q02 is constituted with an FET, with its drain D connected to stationary electrode 116 and its source S connected to shield case 10.

Oscillation circuit 119 provides an oscillation signal to gate G of FET Q02 constituting impedance-varying element Q02. Oscillation circuit 119 should be constituted of a sine wave oscillation circuit that drives impedance-varying element Q02 with a sine wave signal. In such a case, impedance-varying element Q02 is controlled so as to allow the impedance value to change by manifesting the shape of a sine wave along the time axis.

Pre-amplifier 17, which includes FET Q01, gate resistor R01, drain resistor R03 and the like, amplifies the AC signal detected at detection electrode 15 and outputs the amplified AC signal as signal S11.

Figure 9:
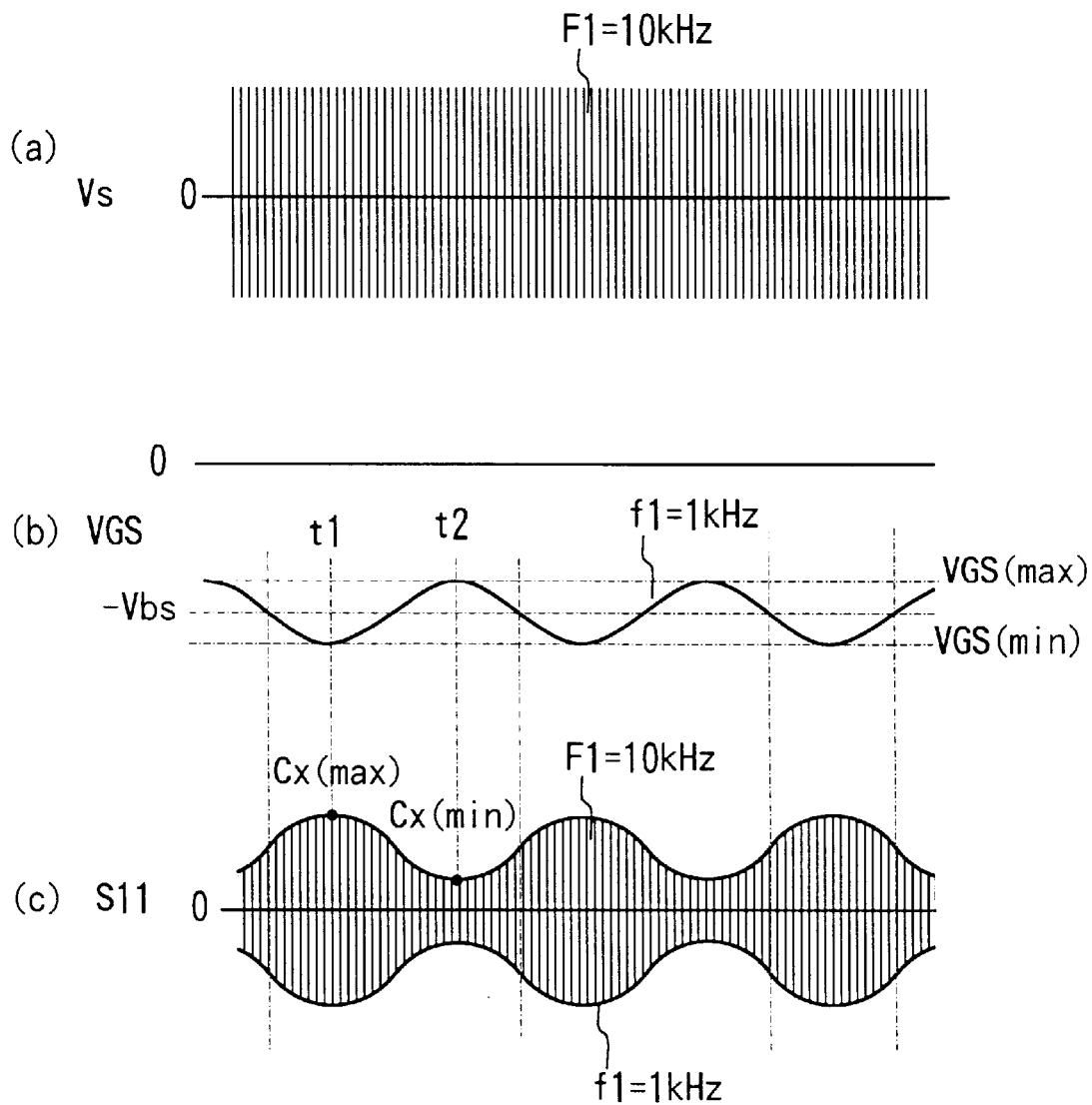
FIG. 9 presents diagrams of the waveforms manifesting at the surface potential sensor and various parts of the surface potential detection apparatus shown in FIG. 8.
Figure 10:
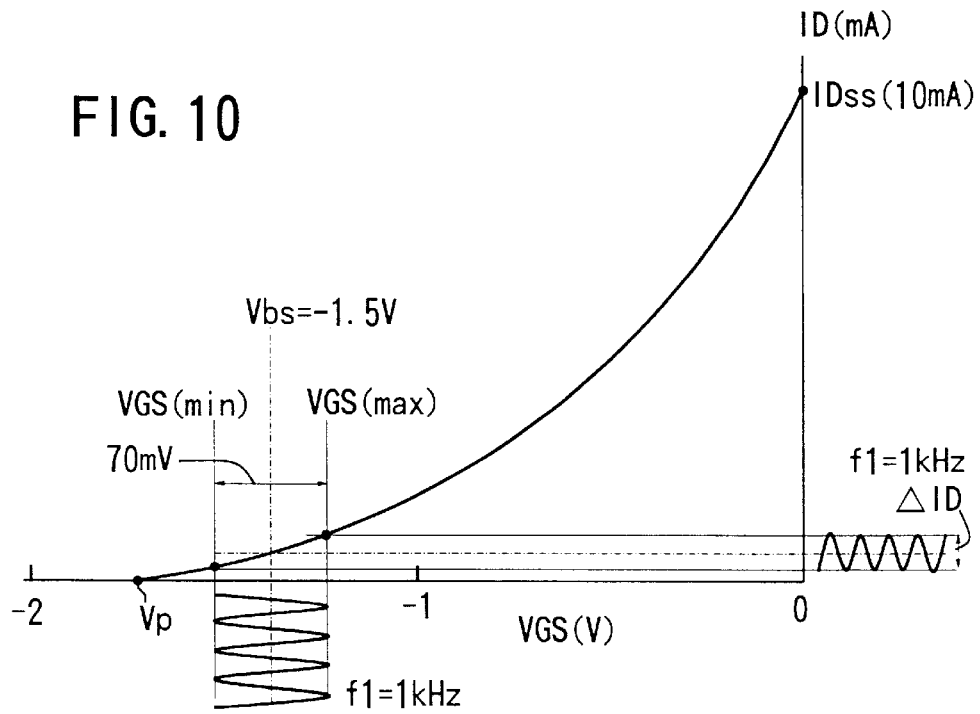
FIG. 10 presents a characteristics diagram illustrating the relationship between the gate/source voltage VGS and the drain current ID at a junction-type field effect transistor (hereinafter referred to as J-FET)

FIG. 9 presents diagrams of the waveforms achieved at surface potential sensor 11 and various parts of the surface potential detection apparatus shown in FIG. 8. The waveforms in FIG. 9 are achieved in an example achieved by utilizing a J-FET to constitute impedance-varying element Q02. FIG. 10 presents a characteristics diagram of the relationship between gate/source voltage VGS and drain current ID at the J-FET.

FIG. 9(a) is a diagram of the waveform achieved by providing a simulated AC signal with frequency F1 set to 10 kHz and a constant amplitude as surface potential Vs.

FIG. 9(b) presents a diagram of the waveform of voltage VGS between the gate and the source of the FET constituting impedance-varying element Q02, which manifests vibration over an amplitude of, for instance, 70 mv relative to negative bias voltage Vbs. Negative bias voltage Vbs may be, for instance, −1.5 V. The gate/source voltage VGS is supplied from oscillation circuit 119. An explanation is given here by assuming that oscillation circuit 119 is constituted of an oscillator that oscillates a sine wave achieving frequency f at 1 kHz. Accordingly, gate/source voltage VGS is a sign-wave voltage with frequency f=1 kHz.

Since the J-FET utilized to constitute impedance-varying element Q02 achieves VGS-ID characteristics shown in FIG. 10, the impedance between drain D and source S manifests a change essentially achieving the shape of a sine wave with frequency f1 at 1 khz when the gate/source voltage VGS is a sign-wave voltage with frequency f1=1 kHz.

FIG. 9(c) is a diagram of the waveform of output signal S11 achieved by supplying gate/source voltage VGS with frequency f1=1 kHz shown in FIG. 9(b) to a point between the gate and the source of the FET constituting impedance-varying element Q02 while surface potential Vs shown in FIG. 9(a) is applied to surface potential measurement target K.

If gate/source voltage VGS with frequency f1 at 1 kHz, a maximum value VGS(max), a minimum value VGS(min) and an amplitude of 70 mv as shown in FIG. 9b is supplied from oscillation circuit 119 to the FET constituting impedance-varying element Q02 while surface potential Vs in FIG. 9(a) is achieved at surface potential measurement target K, the capacitance Cx (see FIGS. 7 and 8) between surface potential measurement target K and detection electrode 15 achieves a maximum value at time point t1 at which gate/source voltage VGS is at the minimum value VGS(min) and achieves a minimum value at time point t2 at which gate/source voltage VGS is at the maximum value VGS (max).

As a result, output S11 from the surface potential sensor manifests as a signal achieved by modulating surface potential Vs having frequency F1=10 kHz with gate/source voltage VGS having frequency f1=1 kHz as shown in FIG. 9c.

Figure 11:
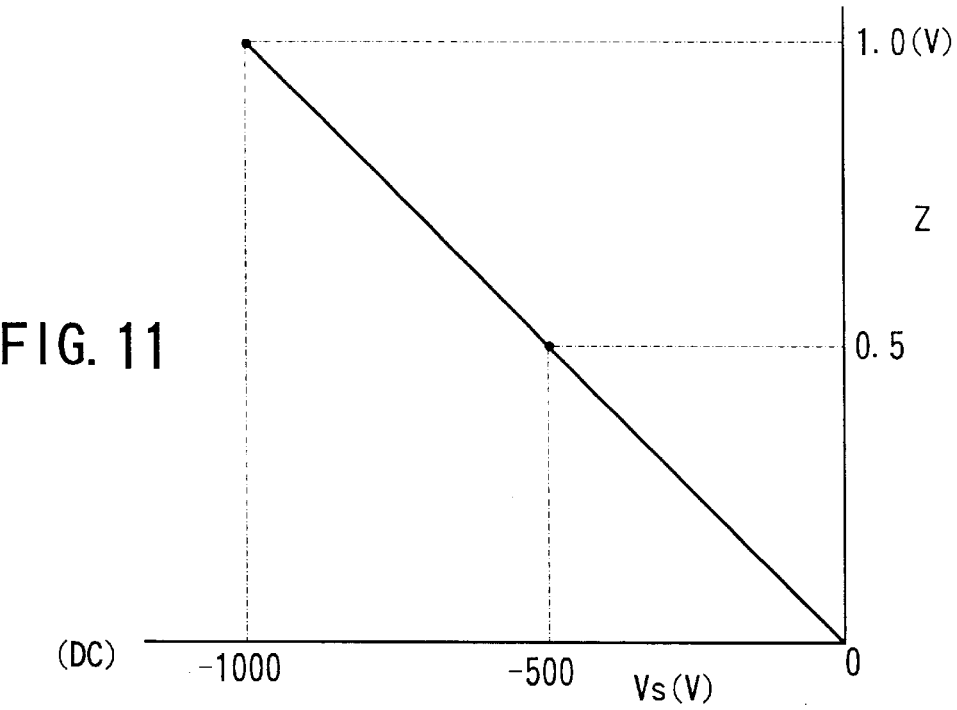
FIG. 11 presents an example of the surface potential-output characteristics achieved at the surface potential detection apparatus according to the present invention.

By providing this signal to single signal processing circuit 3, detection signal Z, which is in almost linear proportion to surface potential Vs as shown in FIG. 11 is obtained.

Figure 12:
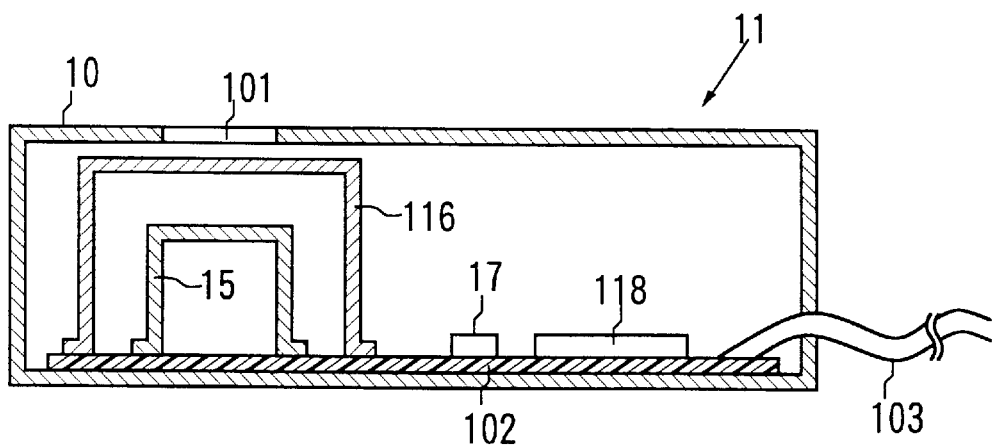
FIG. 12 is a partial sectional view of the structure adopted in the surface potential sensor in the surface potential detection apparatus according to the present invention.

FIG. 12 is a partial sectional view of a structure that may be adopted in the surface potential sensor in the surface potential detection apparatus according to the present invention. Surface potential sensor 11 in the figure includes shield case 10, detection electrode 15 and stationary electrode 116. Shield case 10 includes detection window 101. Detection electrode 15 is provided inside shield case 10 and stationary electrode 116 is also provided inside shield case 10 between detection window 101 and detection electrode 15.

Surface potential sensor in FIG. 12 further includes circuit substrate 102 which supports detection electrode 15 and stationary electrode 116. Circuit substrate 102, which may be constituted of an organic insulating material, an inorganic insulating material or a combined material achieved by combining an organic insulating material and an inorganic insulating material, has a conductive pattern on its surface. Detection electrode 15 and stationary electrode 116 are each mounted at the conductive pattern formed on one surface of circuit substrate 102. In more specific terms, detection electrode 15 and stationary electrode 116 are each constituted of metal plate in a specific shape and are each mounted at the conductive pattern by a means such as soldering on one surface of circuit substrate 102. Stationary electrode 116 is set on the outside of detection electrode 15 over a distance and is also set over a distance from the inner surface of shield case 10 which includes detection window 101.

Surface potential sensor 11 shown in FIG. 12 also includes impedance-varying circuit 118. As explained in detail earlier, impedance-varying circuit 118 cyclically changes between shield case 10 and stationary electrode 116 and is mounted on circuit substrate 102. Also, as explained earlier, it is desirable that impedance-varying circuit 118 achieves characteristics whereby the impedance value manifests a change achieving the shape of a sine wave along the time axis.

Surface potential sensor 11 shown in FIG. 12 further includes pre-amplifier 17. Pre-amplifier 17, which amplifies the signal output from detection electrode 15 and outputs the amplified signal as described earlier, is mounted on circuit substrate 102. The signal output from pre-amplifier 17 is guided to the signal processing circuit through cable 103.

Figure 13:
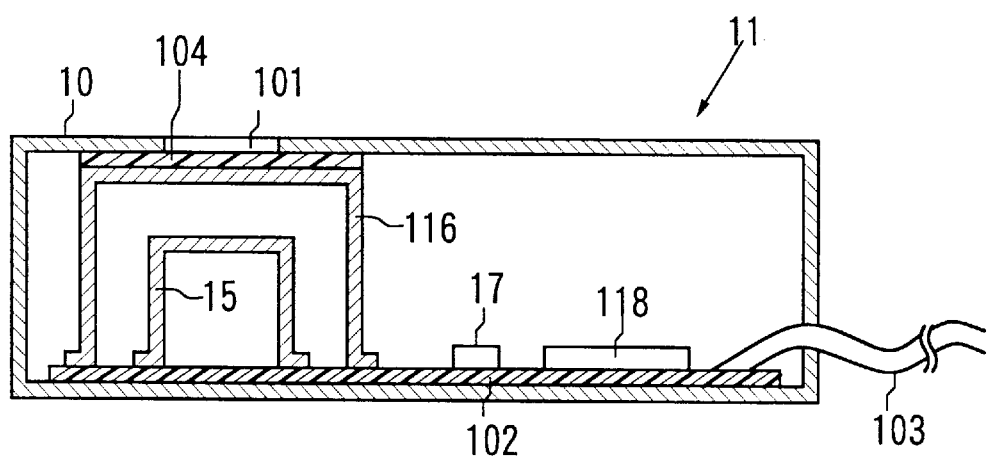
FIG. 13 is a partial sectional view of another example of the surface potential sensor utilized in the surface potential detection apparatus according to the present invention.

FIG. 13 is a partial sectional view of another structural example that may be adopted in the surface potential sensor in the surface potential detection apparatus according to the present invention. In the figure, the same reference numerals are assigned to components identical to those in FIG. 12. Surface potential sensor 11 includes electrical insulation layer 104 filling the gap between stationary electrode 116 and detection window 101. This structure prevents electrical contact between stationary electrode 116 and shield case 10 with a high degree of reliability and also stabilizes the position of stationary electrode 116. Electrical insulation layer 104 may be constituted of an organic insulating material, an inorganic insulating material or a combined material achieved by combining an organic insulating material and an inorganic insulating material. In addition, electrical insulation layer 104 may be deposited on the outer surface of stationary electrode 116 or it may be deposited on the inner surface of shield case 10. Moreover, electrical insulation layer 104 may be deposited over the entire outer surface of stationary electrode 116.

Figure 14:
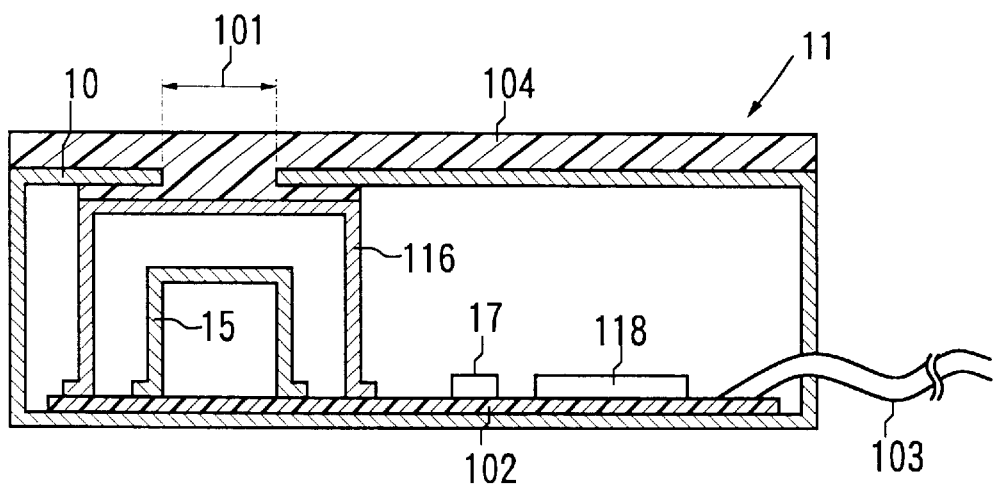
FIG. 14 is a partial sectional view of yet another example of the surface potential sensor utilized in the surface potential detection apparatus according to the present invention.

FIG. 14 is a partial sectional view of yet another structural example that may be adopted in the surface potential sensor in the surface potential detection apparatus according to the present invention. In the figure, the same reference numerals are assigned to components identical to those in FIGS. 12 and 13. Surface potential sensor 11 in the figure is characterized in that electrical insulation layer 104 is deposited onto the outer surface of shield case 10, which includes detection window 101. This structure achieves a contact-type surface potential sensor and a contact-type surface potential detection apparatus that measure the surface potential at surface potential measurement target K (see FIGS. 7 and 8) through direct contact.

In the embodiment shown in FIG. 14, electrical insulation layer 104 which is also present in the space between shield case 10 and stationary electrode 116 prevents electrical contact between stationary electrode 116 and shield case 10 with a high degree of reliability and stabilizes the position of stationary electrode 116.

Figure 15:
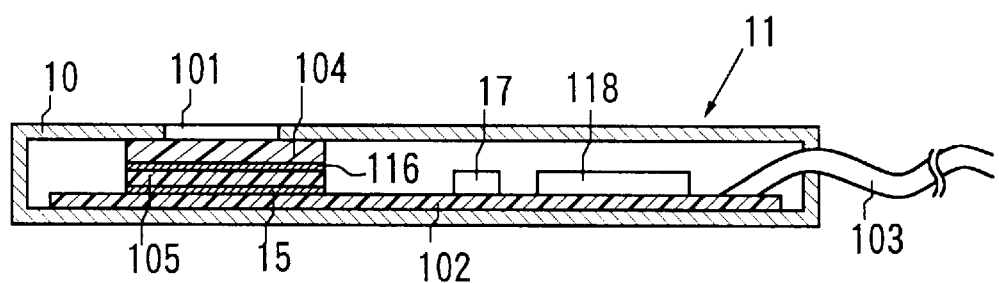
FIG. 15 is a partial sectional view of yet another example of the surface potential sensor utilized in the surface potential detection apparatus according to the present invention.

FIG. 15 is a partial sectional view of yet another structural example that may be adopted in the surface potential sensor in the surface potential detection apparatus according to the present invention. In the figure, the same reference numerals are assigned to components identical to those in FIGS. 12 to 14. In surface potential sensor 11 in the figure, detection electrode 15, which is constituted as a flat plate is laminated over one surface of circuit substrate 102 and stationary electrode 116 is laminated over detection electrode 15 via electrical insulation layer 105. By adopting this structure, the thickness of the surface potential sensor is minimized and the mass productivity is also improved.

Figure 16:
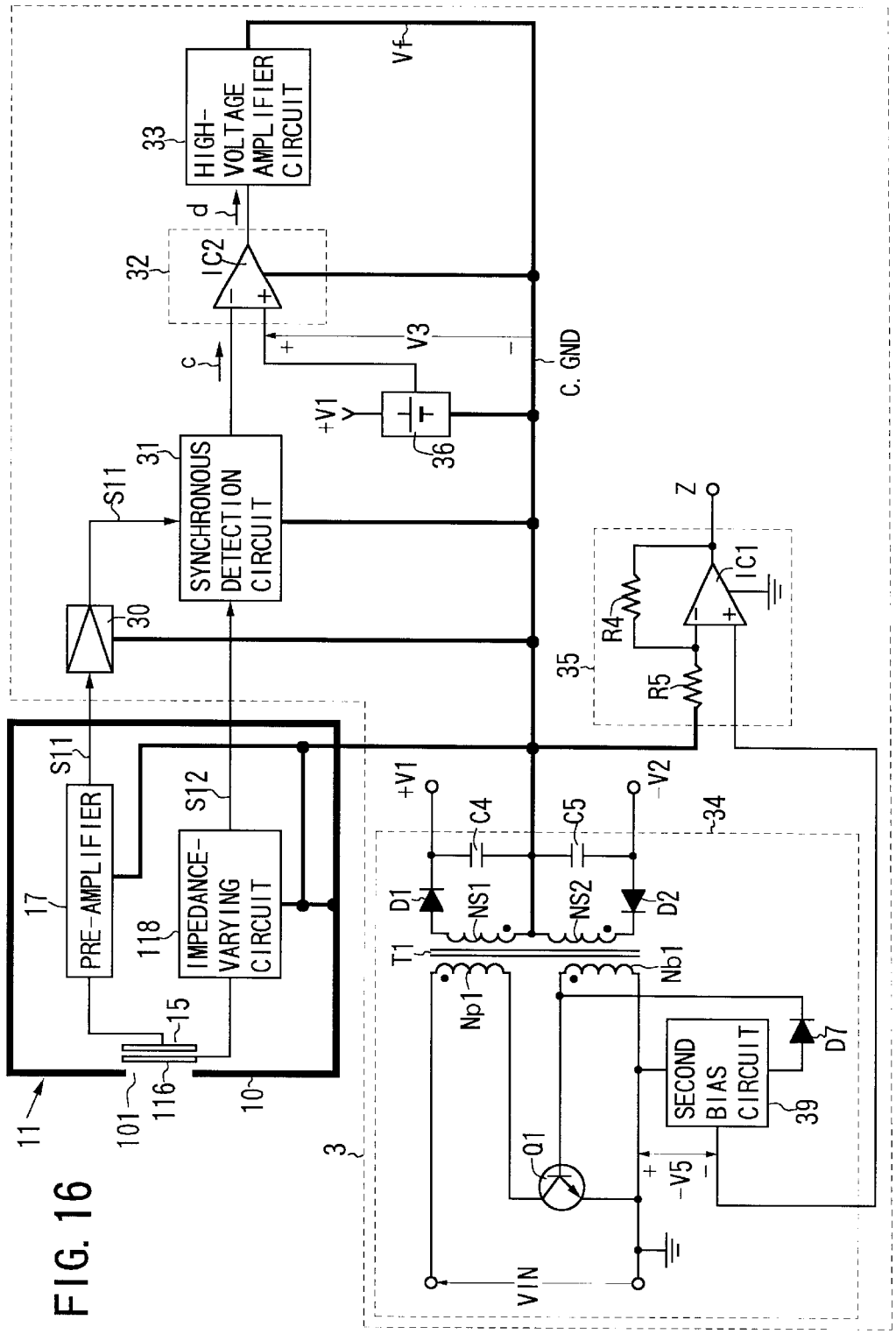
FIG. 16 presents a block diagram illustrating the structure adopted in the surface potential detection apparatus according to the present invention in further detail.

FIG. 16 is a block diagram illustrating the structure assumed in the surface potential detection apparatus according to the present invention in further detail. As shown in FIG. 16, the surface potential detection apparatus according to the present invention includes surface potential sensor 11 and signal processing circuit 3. Surface potential sensor 11 and signal processing circuit 3 share common ground line C.GND. The common ground line C.GND has a potential which floats relative to the ground potential (or a frame ground).

Surface potential sensor 11 may be any of the surface potential sensors according to the present invention explained in reference to FIGS. 7 to 15, and generates AC signal S11 corresponding to the voltage differential representing the difference between the potential at common ground line C.GND and the surface potential. Surface potential sensor 11 includes detection electrode 15, stationary electrode 116, pre-amplifier 17 and impedance-varying circuit 118. Since the specific structural features adopted in surface potential sensor 11 and the operation achieved at surface potential sensor 11 have been explained earlier, a repeated explanation thereof is omitted.

Signal processing circuit 3 comprises synchronous detection circuit 31, integrating circuit 32, high-voltage amplifier circuit 33 and first bias circuit 36. Signal processing circuit 3 in the figure further comprises amplifier circuit 30. Amplifier circuit 30, which is provided with AC signal S11 from surface potential sensor 11, amplifies AC signal S11 and outputs the amplified signal.

Synchronous detection circuit 31, which is provided with AC signal S11 from surface potential sensor 11, detects signal S11 in synchronization with surface potential sensor 11 and outputs detection signal "c". AC signal S11 is provided to synchronous detection circuit 31 in the figure from surface potential sensor 11 via amplifier circuit 30. In addition, synchronous signal S12 is provided to synchronous detection circuit 31 in the figure from surface potential sensor 11 and synchronous detection circuit 31 performs a detection of AC signal S11 in synchronization with synchronous signal S12. Synchronous signal S12 is provided from oscillation circuit 119 (see FIG. 8) included in impedance-varying circuit 118.

Integrating circuit 32 includes operational amplifier IC2 having an inversion input terminal (−) and a non-inversion input terminal (+). Detection signal "c" from synchronous detection circuit 31 is provided to inversion input terminal (−) of integrating circuit 32. Integrating circuit 32 then converts detection signal "c" to a direct current and outputs DC voltage signal "d".

The signal "d" from integrating circuit 32 is provided to high-voltage amplifier circuit 33 which then supplies a high DC voltage Vf for roughly equalizing the potential at common ground line C.GND to the potential at the measurement target surface to common ground line C.GND. More specifically, high-voltage amplifier circuit 33 raises the voltage of signal "d" provided by integrating circuit 32. The signal, the voltage of which has been raised at high-voltage amplifier circuit 33, is then fed back to pre-amplifier 17 and impedance-varying circuit 118 as a feedback voltage Vf. As a result, feedback control, which roughly equalizes the potential at common ground line C.GND to the surface potential at surface potential measurement target K, is implemented.

First bias circuit 36 applies positive voltage V3 which is positive relative to the potential at common ground line C.GND to non-inversion input terminal (+) of integrating circuit 32.

Signal processing circuit 3 further comprises detection signal output circuit 35. Detection signal output circuit 35 is constituted of operational amplifier IC1 having inversion input terminal (−) and non-inversion input terminal (+). Inversion input terminal (−) of detection signal output circuit 35 is guided to common ground line C.GND. Detection signal output circuit 35 outputs detection signal Z.

Signal processing circuit 3 further includes source circuit 34. Source circuit 34 comprises transformer T1 and switching element Q1. Transformer T1 is provided with first winding Np1, second windings NS1 and NS2 and third winding Nb1. First winding Np1 is connected between a pair of DC voltage input ends, and second windings NS1 and NS2 are trans-coupled with first winding Np1.

Switching element Q1 is provided with two main electrodes and a control electrode. Typical examples of such a switching element Q1 include an FET and a bipolar transistor. The two main electrodes of switching element Q1 are connected in series to first winding Np1. The control electrode is led to third winding Nb1. Switching element Q1 continuously performs a switching operation in conformance to the signal (feedback signal) provided to its control electrode from third winding Nb1.

Transformer T1 is provided with two second windings NS1 and NS2 attached to a center tap. A rectifying/smoothing circuit which includes diodes D1 and D2 and capacitors C4 and C5 is connected to second windings NS1 and NS2. A positive source voltage (+V1) and a negative source voltage (−V2) are generated at source circuit 34. Positive source voltage (+V1) and negative source voltage (−V2) are set in reference to the potential at common ground line C.GND. Positive source voltage (+V1) and negative source voltage (−V2) are supplied to the various components as operating voltages.

Signal processing circuit 3 is further provided with second bias circuit 39. Second bias circuit 39 applies negative voltage (−V5) to non-inversion input terminal (+) of detection signal output circuit 35. Second bias circuit 39 in the figure, which is connected to third winding Nb1, generates negative voltage (−V5) with the fly-back voltage generated at third winding Nb1 when switching element Q1 is turned off.

In the surface potential detection apparatus described above, AC signal S11 corresponding to the voltage differential representing the difference between the surface potential and the potential at the common ground line C.GND is generated by surface potential sensor 11 and AC signal S11 is provided to synchronous detection circuit 31 via preamplifier 17 and amplifier circuit 30.

At synchronous detection circuit 31, AC signal S11 provided from surface potential sensor 11 is detected in synchronization with the impedance-varying operation performed at impedance-varying circuit 118 to generate detection signal "c". Detection signal "c" is provided to inversion input terminal (−) of operational amplifier IC2 constituting integrating circuit 32. Integrating circuit 32 converts detection signal "c" to DC signal "d" by integrating detection signal "c" and outputs DC signal "d". The level of DC signal "d" corresponds to the voltage differential representing the surface potential and the potential at common ground line C.GND.

DC signal "d" output from integrating circuit 32 is provided to high-voltage amplifier circuit 33 which then supplies a high DC voltage Vf that will roughly equalize the potential at common ground line C.GND to the potential at the measurement target surface to the common ground line C.GND. Through the circuit operation described above, the potential at common ground line C.GND is controlled so that it becomes essentially equal to the surface potential.

When the potential at common ground line C.GND is equal to the surface potential, the electrical field between the detection electrode at surface potential sensor 11 and the measurement target surface is 0. Accordingly, by extracting the potential at common ground line C.GND as detection signal Z from the detection signal output circuit 35, a highly accurate detection signal Z with a very low degree of distance dependency is obtained even when the distance between surface potential sensor 11 and the measurement target surface changes.

In the surface potential detection apparatus shown in the figure, signal processing circuit 3 is further provided with first bias circuit 36. Positive voltage (+V3) is applied from first bias circuit 36 to non-inversion input terminal (+) of integrating circuit 32. The bias applied through positive voltage (+V3) achieves the relationship of detection signal Z to surface potential Vs (detection characteristics) shown in FIG. 17.

Figure 17:
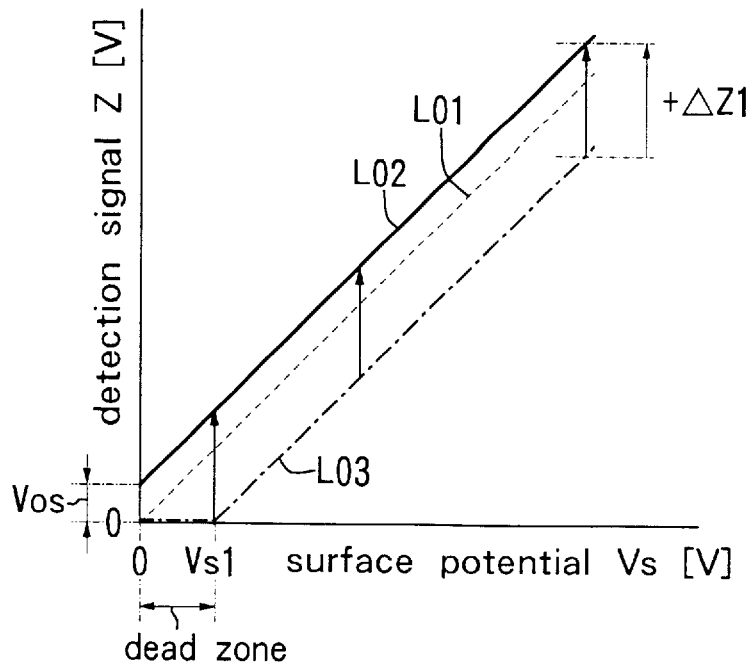
FIG. 17 illustrates the relationship that a detection signal has to the surface potential (detection characteristics)
Figure 18:
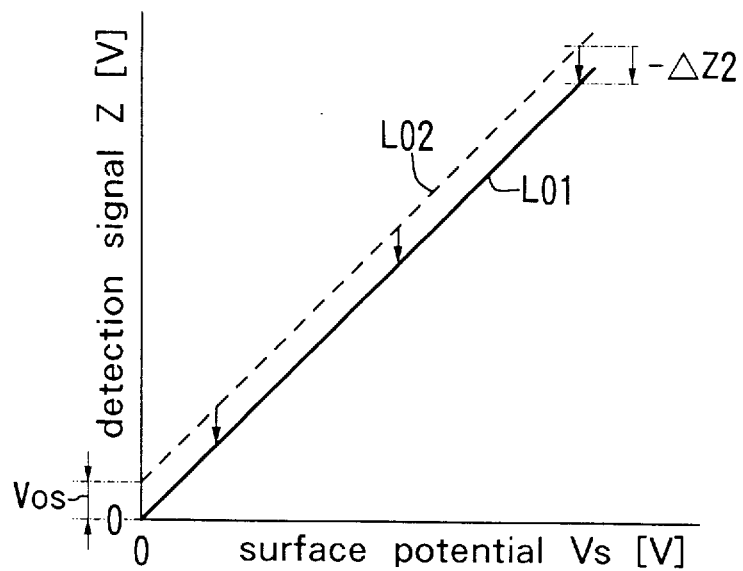
FIG. 18 illustrates the adjustment of the detection signal offset relative to the surface potential.

In FIG. 17, characteristics L01 are ideal characteristics, characteristics L03 are characteristics manifesting when no bias is applied by the first bias circuit 36 and characteristics L02 are characteristics achieved by applying a bias with first bias circuit 36. Characteristics L03 manifests a dead zone in which detection signal Z=0 until surface potential Vs exceeds VS1 (see FIG. 16). By applying positive voltage (+V3) to non-inversion input terminal (+) of integrating circuit 32 from first bias circuit 36, characteristics L02 achieved by adding voltage ΔZ1 to characteristics L03 are realized.

When surface potential Vs is 0 in characteristics L02, detection signal Z is generated as a positive offset voltage Vos. As a result, no dead zone manifests in the characteristics L02.

Furthermore, positive voltage (+V3) applied from first bias circuit 36 to non-inversion input terminal (+) of integrating circuit 32 is set in reference to the potential at common ground line C.GND. Consequently, a stable offset voltage Vos is obtained.

Offset voltage Vos may be easily and highly accurately adjusted at the circuit provided at a rear stage relative to integrating circuit 32. Namely, the present invention provides a foundation for adjusting or eliminating offset voltage Vos with ease and with a high degree of accuracy.

In addition, since it is not necessary to assure a high degree of voltage stability at source circuit 34, the cost of source circuit 34 in the surface potential detection apparatus is reduced. The embodiment does not include the dropper-type stable source (3-terminal regulator) required in the prior art. Thus, the surface potential detection apparatus achieving a high degree of overall power efficiency is obtained.

In one desirable mode for canceling out offset voltage Vos generated through first bias circuit 36, second bias circuit 39 is added at detection signal output circuit 35 in the embodiment. Negative voltage (−V5) is applied from second bias circuit 39 to non-inversion input terminal (+) of detection signal output circuit 35.

By adopting this structure, the characteristics of detection signal Z relative to surface potential Vs can be shifted to lower the value of detection signal Z relative to a given surface potential Vs. The extent of shift ΔZ2 corresponds to the level of negative voltage (−V5). Thus, by adjusting the level of negative voltage (−V5), offset voltage Vos generated through first bias circuit 36 can be canceled to set the relationship between surface potential Vs and detection signal Z as represented by linear line L01 passing through origin point (0, 0) on the graph. As a result, detection signal Z with no offset voltage Vos is achieved. More specifically, the level of negative voltage (−V5) should be adjusted so as to equalize it to the level of offset voltage Vos in characteristics L02 and then characteristics L02 should be matched to ideal characteristics L01.

Figure 19:
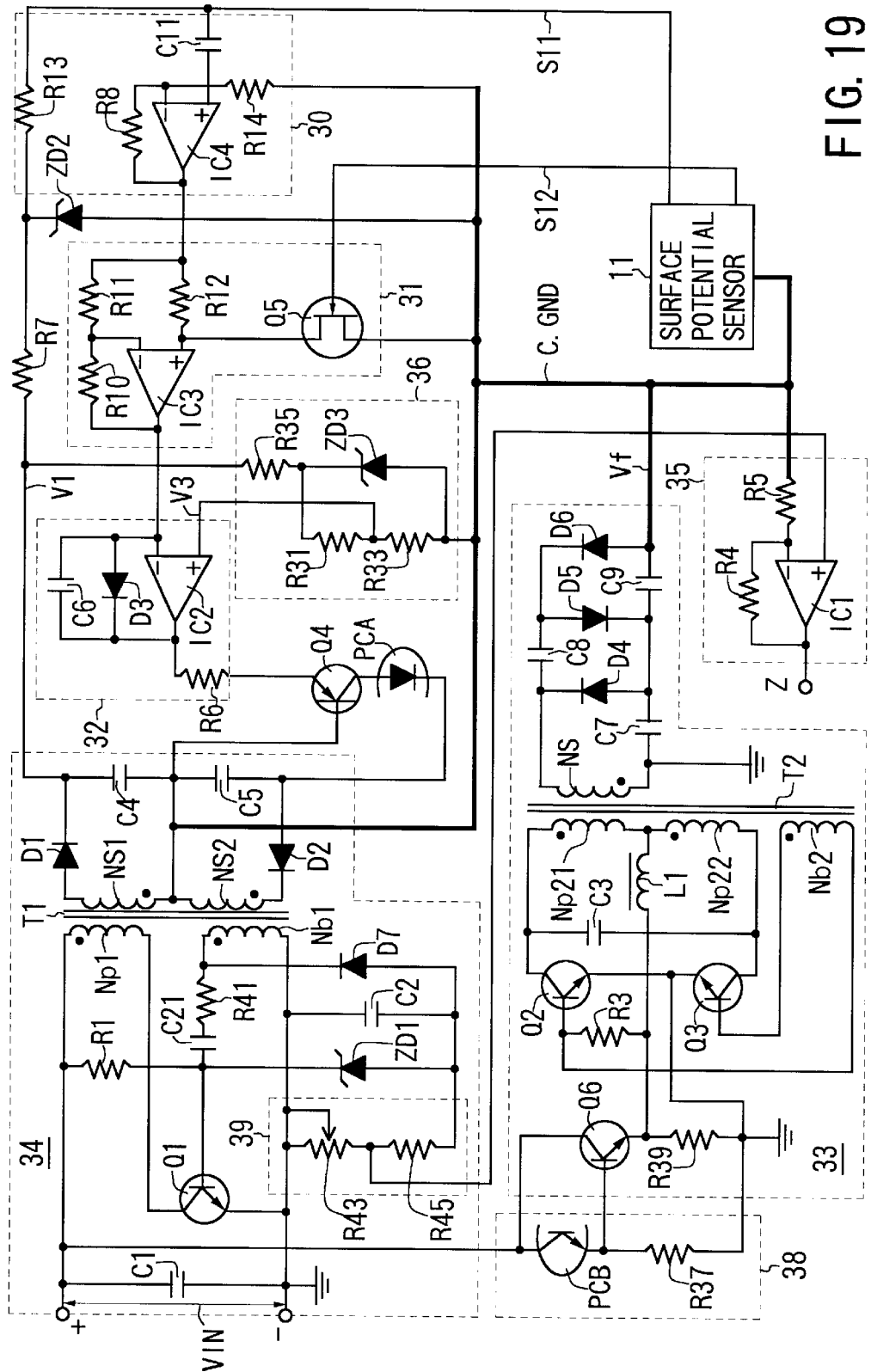
FIG. 19 shows in further detail the circuit structure adopted in the signal processing circuit included in the surface potential detection apparatus according to the present invention.

FIG. 19 shows a circuit structure that may be adopted in the signal processing circuit included in the surface potential detection apparatus according to the present invention in specific detail. Amplifier circuit 30 which includes operational amplifier IC4, resistors R8, R13 and R14 and capacitor C11 amplifies detection signal S11 provided through capacitor C11.

The signal which has become amplified at amplifier circuit 30 is provided to synchronous detection circuit 31. Synchronous detection circuit 31 is provided with operational amplifier IC3, resistors R9, R10, R11 and R12 and FET Q5 constituting a switching element. Synchronous detection circuit 31 performs a synchronous detection of the signal provided from amplifier circuit 30 in conformance to synchronous signal S12 provided from impedance-varying circuit 118 (see FIGS. 3 and 4) of surface potential sensor 11 to the gate of FET Q5.

The signal having undergone the synchronous detection is provided to integrating circuit 32 where it is converted to a direct current. Integrating circuit 32 in the figure includes operational amplifier IC2, capacitor C6, diode D3 and output resistor R6. Transistor Q4 and light emitting diode PCA are connected to output resistor R6. Light emitting diode PCA emits light in response to the output from integrating circuit 32.

First bias circuit 36 divides positive source voltage (+V 1) which is set in reference to the potential at common ground line C.GND supplied from source circuit 34, through resistor R35 and Zener diode ZD3, divides the constant voltages manifesting at the two ends of Zener diode ZD3 through resistors R31 and R33 and supplies positive voltage V3 resulting from the voltage division to non-inversion input terminal (+) of operational amplifier IC2 constituting integrating circuit 32. The operation achieved at first bias circuit 36 has already been explained.

High-voltage amplifier circuit 33 includes an oscillation circuit, transformer T2 and a triple voltage rectifier circuit. The oscillation circuit includes transistors Q2 and Q3, primary windings Np21 and Np22 of transformer T2, auxiliary winding Nb2 provided at transformer T2, capacitor C3 and inductor L1. Through the switching operation achieved at transistors Q2 and Q3, primary windings Np21 and Np22 of transformer T2 are excited, and a feedback signal is provided to the bases of transistors Q2 and Q3 via auxiliary winding Nb2 inductively coupled with primary windings Np21 and Np22. Transistors Q2 and Q3 are allowed to sustain the self oscillation by the feedback signal described above and the resonance phenomenon occurring at an LC resonance circuit that includes capacitor C3 and inductor L1.

The triple voltage rectifier circuit, which is connected to secondary winding NS of transformer T2, implements triple voltage rectification on AC voltage generated at secondary winding NS in response to the oscillation operation of the oscillation circuit and supplies the rectified voltage to common ground line C.GND. The rectified voltage thus supplied controls the potential at common ground line C.GND. The triple voltage rectifier circuit in the figure comprises capacitors C7 to C9 and diodes D4 to D6.

The input side of high-voltage amplifier circuit 33 is connected with an input circuit constituted of photo-transistor PCB and transistor Q6. Photo-transistor PCB is optically coupled with light emitting diode PCA which is driven by the output from integrating circuit 32. Thus, the voltage controlled in correspondence to the level of the output signal from integrating circuit 32 is supplied to the input side of the oscillation circuit constituting high-voltage amplifier circuit 33.

The potential at common ground line C.GND is converted to an appropriate potential by detection signal output circuit 35 and is output as detection signal Z.

DC/DC converter 34 engages switching element Q1 to switch DC input voltage VIN supplied through primary winding NP1 of transformer T1. During the switching operation, the voltages generated at secondary windings NS1 and NS2 of transformer T1 are converted to DC voltages by rectifying them at diodes D1 and D2 and then smoothing them at capacitors C4 and C5. The DC voltages are stabilized at Zener diode ZD2 and then supplied to amplifier circuit 30, synchronous detection circuit 31, integrating circuit 32, light emitting diode PCA and the like.

Second bias circuit 39 charges capacitor C2 through diode D7 by using the fly-back voltage generated at third winding Nb1 of transformer T1 when switching element Q1 is turned off. The terminal voltage at capacitor C2 is divided through resistors R43 and R45 to generate negative voltage (−V5). This negative voltage (−V5) is supplied to non-inversion input terminal (+) of operational amplifier IC1 included in detection signal output circuit 35. Negative voltage (−V5) is adjusted in conformance to the voltage dividing ratio of resistor R43 which is constituted as a variable resistor and resistor R45.

FIG. 19 only presents an example of the signal processing circuit that may be adopted. The signal processing circuit according to the present invention may adopt any of various circuit structures.

Figure 20:
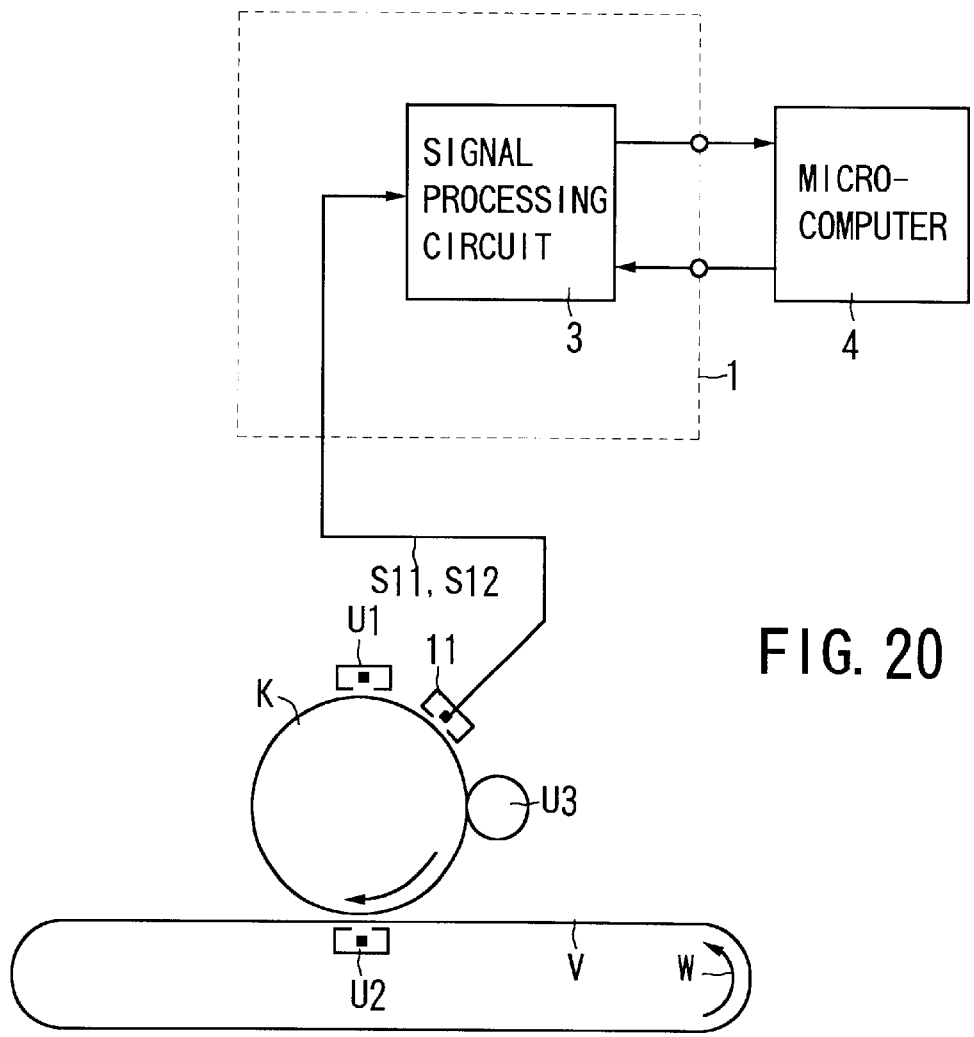
FIG. 20 schematically illustrates a structure that may be adopted to detect the surface potential at a photosensitive drum by employing the surface potential detection apparatus according to the present invention.

FIG. 20 schematically illustrates the structure that may be assumed to detect the surface potential at a photosensitive drum by employing the surface potential detection apparatus according to the present invention. In FIG. 20, K indicates photosensitive drum, V indicates a transfer belt and W indicates the direction along which the transfer belt runs. Photosensitive drum K is provided for the color black. Photosensitive drum K is provided with charge colortron U1, transfer colortron U2 and developer U3.

Surface potential detection apparatus 1 comprises surface potential sensor 11 and signal processing circuit 3. Surface potential sensor 11 is secured at a position over, for instance, a 2.5 mm distance from the surface of photosensitive drum K. Since surface potential sensor 11 and signal processing circuit 3 have been explained in detail earlier, a repeated explanation thereof is omitted.

While the surface potential at a single photosensitive drum K is detected in FIG. 20, the surface potential detection apparatus according to the present invention may also be utilized to detect the surface potentials at a plurality of photosensitive drums, as well.

Moreover, although not shown, the various embodiments explained above may be adopted in combination. For instance, the embodiment illustrative in FIGS. 1 to 5 may be combined with any of the embodiments presented in FIGS. 7 to 19.

What is claimed is:

1. A surface potential detection apparatus, comprising:
   a plurality of surface potential sensors provided independently of one another;
   a switching circuit that individually selects and outputs signals provided by said plurality of surface potential sensors with varied timing for each of said plurality of surface potential sensors; and
   a single signal processing circuit connected to said plurality of surface potential sensors via said switching circuit and shared by said plurality of surface potential sensors.

2. The surface potential detection apparatus of claim 1, wherein:
   said plurality of surface potential sensors each generate an AC signal corresponding to a surface potential at a measurement target surface by interrupting an electrical field between a detection electrode thereof and said measurement target surface;
   said switching circuit individually selects and outputs detection signals and synchronous signals that are in synchronization with a drive signal for interruption provided by said plurality of surface potential sensors with timing varied for each of said plurality of surface potential sensors; and
   said signal processing circuit individually processes said detection signals and said synchronous signals provided via said switching circuit for each of said plurality of surface potential sensors.

3. The surface potential detection apparatus of claim 2, wherein:
   said switching circuit engages in an interlocked selection operation so as to allow the detection signal and the synchronous signal corresponding to each of said plurality of surface potential sensors to be selected simultaneously.

4. The surface potential detection apparatus of claim 1, wherein:
   said plurality of surface potential sensors and said signal processing circuit share a common ground line; and
   said signal processing circuit controls the potential at said common ground line so as to roughly equalize a potential at said common ground line to a potential at a measurement target surface.

5. The surface potential detection apparatus of claim 4, wherein said signal processing circuit comprises:
   an amplifier circuit that amplifies the respective detection signal provided by each of said plurality of surface potential sensors and outputs the amplified signal;

a synchronous wave detection circuit that detects said signal provided by said amplifier circuit in synchronization with the respective synchronous signal;

an integrating circuit that converts a wave detection output signal provided from said synchronous wave detection circuit to a direct current, and outputs the direct current; and a high-voltage amplifier circuit provided with a signal from said integrating circuit, wherein said high-voltage amplifier circuit supplies a high DC voltage to said common ground line to roughly equalize the potential at said common ground line to the measurement target surface potential.

6. The surface potential detection apparatus of claim 1, wherein said plurality of surface potential sensors each comprise:

a detection electrode that generates an electrical field to enable a non-contact measurement of a surface potential at a measurement target surface;

a chopper that cyclically chops an electrical field between said measurement target surface and said detection electrode;

a pre-amplifier comprising a circuit for converting an impedance of an AC signal detected at said detection electrode; and a chopper drive circuit that excites said chopper.

7. An image generating apparatus, comprising:

a plurality of photosensitive drums; and a surface potential detection apparatus comprising:

a plurality of surface potential sensors provided independently of one another, each in correspondence to one of said plurality of photosensitive drums to detect a surface potential at the corresponding photosensitive drum;

a switching circuit that individually selects and outputs signals provided by said plurality of surface potential sensors with varied timing for each of said plurality of surface potential sensors; and a single signal processing circuit connected to said plurality of surface potential sensors via said switching circuit, and shared by said plurality of surface potential sensors.

8. The image generating apparatus of claim 7, further comprising:

a transfer belt, wherein said plurality of photosensitive drums are provided in tandem along a direction in which said transfer belt runs.

9. A method of detecting a surface potential, comprising:

providing a stationary electrode between a surface potential measurement target and a detection electrode;

electromagnetically shielding areas around said detection electrode and said stationary electrode;

arranging said stationary electrode facing opposite said surface potential measurement target through an unshielded detection window; and cyclically changing an impedance between a shield potential and said stationary electrode.

10. The method of claim 9, wherein a value of said impedance changes by manifesting a shape of a sine wave along a time axis.

11. A surface potential detection apparatus comprising:

a surface potential sensor that includes a shield case, a detection electrode, a stationary electrode, and an impedance-varying circuit; and a signal processing circuit that processes a signal output from said surface potential sensor, said shield case provided with a detection window and covering said detection electrode, said stationary electrode, and said impedance-varying circuit;

said stationary electrode provided between said detection window and said detection electrode; and said impedance-varying circuit provided to cyclically change an impedance between said shield case and said stationary electrode.

12. The surface potential detection apparatus of claim 11, wherein an impedance value at said impedance-varying circuit manifests a change achieving a shape of a sine wave along a time axis.

13. The surface potential detection apparatus of claim 11, wherein:

said surface potential sensor and said signal processing circuit operate by using a potential at a common ground line as a reference potential, and said common ground line achieves a potential that floats relative to a ground potential.

14. The surface potential detection apparatus of claim 13, wherein said signal processing circuit comprises:

a synchronous wave detection circuit that performs a detection of an AC signal provided from said surface potential sensor in synchronization with an interruption operation at said surface potential sensor;

an integrating circuit that includes an operational amplifier comprising an inversion input terminal and a non-inversion input terminal, inputs a wave detection output signal from said synchronous wave detection circuit into said inversion input terminal, converts said wave detection output signal to a direct current, and outputs the direct current resulting from the conversion;

a high-voltage amplifier circuit provided with a signal from said integrating circuit, and configured to supply a high DC voltage for equalizing the potential at said common ground line to a measurement target surface potential at said common ground line; and a first bias circuit that applies a positive voltage set in reference to the potential at said common ground line to said non-inversion input terminal of said integrating circuit.

15. The surface potential detection apparatus of claim 14, wherein said signal processing circuit further comprises:

a detection signal output circuit comprising an operational amplifier having an inversion input terminal and a non-inversion input terminal, with said inversion input terminal led to said common ground line to output a surface potential detection signal; and a second bias circuit that applies a negative voltage to said non-inversion input terminal of said detection signal output circuit.

16. The surface potential detection apparatus of claim 15, wherein said signal processing circuit further comprises:

a source circuit having a transformer and a switching element, said transformer provided with a first winding, a second winding, and a third winding;

said first winding connected between a pair of DC voltage input ends;

said second winding trans-coupled with said first winding;

said switching element provided with two main electrodes connected in series to said first winding, and a control electrode led to said third winding to continuously perform a switching operation in conformance to a signal provided from said third winding to said control electrode; and said second bias circuit connected to said third winding and generating said negative voltage by using a flyback voltage generated at said third winding when said switching element is turned off.

17. The surface potential detection apparatus of claim 11 comprising a plurality of said surface potential sensors provided independently of one another and further comprising:

a switching circuit that individually selects and outputs signals provided from said plurality of surface potential sensors with varied timing for each of said plurality of surface potential sensors, wherein said signal processing circuit is connected to said plurality of surface potential sensors via said switching circuit, and is shared by said plurality of surface potential sensors.

18. A surface potential sensor, comprising:

a shield case having a detection window;

a detection electrode provided inside said shield case;

a stationary electrode set inside said shield case at a position between said detection window and said detection electrode such that said stationary electrode covers said detection electrode: and an impedance-varying circuit that cyclically changes an impedance between said shield case and said stationary electrode.

19. The surface potential sensor of claim 18, wherein an impedance value at said impedance-varying circuit manifests a change achieving a shape of a sine wave along a time axis.

20. An image generating apparatus, comprising:

a photosensitive drum; and a surface potential detection apparatus, comprising:

a surface potential sensor provided to detect a surface potential at said photosensitive drum and having a shield case, a detection electrode, a stationary electrode, and an impedance-varying circuit, wherein:

said shield case comprises a detection window and covers said detection electrode, said stationary electrode, and said impedance-varying circuit;

said stationary electrode is set between said detection window and said detection electrode; and said impedance-varying circuit is provided to cyclically change the impedance between said shield case and said stationary electrode; and a signal processing circuit that processes a signal output from said surface potential sensor.

21. The image generating apparatus of claim 20, wherein:

a plurality of said photosensitive drums are provided; and a plurality of said surface potential sensors are provided, each in correspondence to one of said photosensitive drums to detect the surface potential at the corresponding photosensitive drum.

22. The image generating apparatus of claim 21, further comprising:

a transfer belt, wherein said plurality of photosensitive drums are provided in tandem along the direction in which said transfer belt runs.

23. A surface potential detection apparatus, comprising:

a plurality of surface potential sensors provided independently of one another;

a switching circuit that individually selects and outputs signals provided from said plurality of surface potential sensors with varied timing for each of said plurality of surface potential sensors; and a signal processing circuit that processes signals output from each of said plurality of surface potential sensors, wherein each of the plurality of surface potential sensors includes a shield case, a detection electrode, a stationary electrode, and an impedance-varying circuit;

said shield case is provided with a detection window and covers said detection electrode, said stationary electrode, and said impedance-varying circuit;

said stationary electrode is provided between said detection window and said detection electrode;

said impedance-varying circuit is provided to cyclically change an impedance between said shield case and said stationary electrode;

said signal processing circuit is connected to said plurality of surface potential sensors via said switching circuit, and is shared by said plurality of surface potential sensors.

24. A surface potential sensor, comprising:

a shield case having a detection window;

a detection electrode provided inside said shield case;

a stationary electrode set inside said shield case at a position between said detection window and said detection electrode; and an impedance-varying circuit that cyclically changes an impedance between said shield case and said stationary electrode.

25. The surface potential sensor of claim 24, wherein an impedance value at said impedance-varying circuit manifests a change achieving a shape of a sine wave along a time axis.

26. A surface potential detection apparatus, comprising:

a plurality of surface potential sensors provided independently of one another;

a switching circuit that individually selects and outputs signals provided by said plurality of surface potential sensors with varied timing for each of said plurality of surface potential sensors; and a signal processing circuit connected to said plurality of surface potential sensors via said switching circuit and shared by said plurality of surface potential sensors.

27. An image generating apparatus, comprising:

a plurality of photosensitive drums; and a surface potential detection apparatus comprising:

a plurality of surface potential sensors provided independently of one another, each in correspondence to one of said plurality of photosensitive drums to detect a surface potential at the corresponding photosensitive drum;

a switching circuit that individually selects and outputs signals provided by said plurality of surface potential sensors with varied timing for each of said plurality of surface potential sensors; and a signal processing circuit connected to said plurality of surface potential sensors via said switching circuit, and shared by said plurality of surface potential sensors.

* * * * *